US012581582B2

(12) United States Patent
Akimoto et al.

(10) Patent No.: US 12,581,582 B2
(45) Date of Patent: Mar. 17, 2026

(54) LIGHT SOURCE AND DRIVING METHOD OF LIGHT SOURCE

(71) Applicant: NICHIA CORPORATION, Anan (JP)

(72) Inventors: Hajime Akimoto, Anan (JP); Naoto Fujiwara, Tokushima (JP); Takeshi Morikawa, Tokushima (JP); Akira Hori, Tokushima (JP)

(73) Assignee: NICHIA CORPORATION, Anan (JP)

( * ) Notice: Subject to any disclaimer, the term of this patent is extended or adjusted under 35 U.S.C. 154(b) by 51 days.

(21) Appl. No.: 18/619,067

(22) Filed: Mar. 27, 2024

(65) Prior Publication Data

US 2024/0334575 A1 Oct. 3, 2024

(30) Foreign Application Priority Data

Mar. 30, 2023 (JP) ................................ 2023-054809

(51) Int. Cl.

*H05B 47/16* (2020.01)
*F21V 9/30* (2018.01)
*F21Y 113/13* (2016.01)
*F21Y 115/10* (2016.01)
*H05B 45/44* (2020.01)

(52) U.S. Cl.

CPC ............... *H05B 47/16* (2020.01); *F21V 9/30* (2018.02); *H05B 45/44* (2020.01); *F21Y 2113/13* (2016.08); *F21Y 2115/10* (2016.08)

(58) Field of Classification Search

None

See application file for complete search history.

(56) References Cited

U.S. PATENT DOCUMENTS 7,193,246 B1 3/2007 Tanizawa et al.
2011/0115407 A1* 5/2011 Wibben ................ H05B 45/20 315/294
2013/0020595 A1 1/2013 Moriguchi et al.
2016/0198539 A1* 7/2016 Lin ....................... H05B 45/44 315/294

(Continued)

FOREIGN PATENT DOCUMENTS

EP 3505818 7/2019
JP 2004-343147 12/2004
JP 2005-116738 4/2005

(Continued)

*Primary Examiner* — Kenneth B Wells
(74) *Attorney, Agent, or Firm* — MORI & WARD, LLP

(57) ABSTRACT

A light source including a light-emitting device including a substrate, and a first light-emitting element and a second light-emitting element that are located on the substrate. The light source further includes a drive circuit to supply a current to drive the light-emitting device, a switch configured to switch between a first state of supplying a current to only the first light-emitting element and a second state of supplying a current to only the second light-emitting element, and a timing controller configured to control a timing of an operation of the switch. A light emission peak wavelength of the first light-emitting element is 430 nm or greater and less than 490 nm. A light emission peak wavelength of the second light-emitting element is 490 nm or greater and less than 570 nm. A forward voltage of the second light-emitting element is less than a forward voltage of the first light-emitting element.

10 Claims, 19 Drawing Sheets

(56) References Cited

U.S. PATENT DOCUMENTS

| | | | | |
|---|---|---|---|---|
| 2017/0215242 | A1 | 7/2017 | Wiegand | |
| 2020/0303598 | A1 * | 9/2020 | Kim .................... | H10H 20/8513 |

FOREIGN PATENT DOCUMENTS

| | | |
|---|---|---|
| JP | 2010-183043 | 8/2010 |
| JP | 2013-026510 | 2/2013 |
| JP | 2013-134933 | 7/2013 |
| JP | 2013-157331 | 8/2013 |
| JP | 2019-091653 | 6/2019 |
| JP | 2020-098855 | 6/2020 |
| JP | 2022-023595 | 2/2022 |
| WO | WO 2014/175055 | 10/2014 |

* cited by examiner

LIGHT SOURCE AND DRIVING METHOD OF LIGHT SOURCE

CROSS-REFERENCE TO RELATED APPLICATION

This application claims priority to Japanese Patent Application No. 2023-054809, filed on Mar. 30, 2023, the disclosure of which is hereby incorporated by reference in its entirety.

BACKGROUND

The present disclosure relates to a light source and a driving method of a light source.

For example, JP-A 2013-026510 (Kokai) discusses an LED module including multiple LED chips emitting light of different colors.

SUMMARY

Embodiments of the disclosure can advantageously provide a light source and a driving method of a light source in which a desired chromaticity is inexpensively obtained.

In an embodiment of the disclosure, a light source includes a light-emitting device including a substrate, and a first light-emitting element and a second light-emitting element that are located on the substrate; a drive circuit configured to supply a current that is to drive the light-emitting device; a switch configured to switch between a first state of supplying a current to only the first light-emitting element, and a second state of supplying a current to only the second light-emitting element; and a timing controller configured to control a timing of an operation of the switch. A light emission peak wavelength of the first light-emitting element is 430 nm or greater and less than 490 nm. A light emission peak wavelength of the second light-emitting element is 490 nm or greater and less than 570 nm. A forward voltage of the second light-emitting element is less than a forward voltage of the first light-emitting element.

In an embodiment of the disclosure, a driving method of a light source includes causing a length of a first period of the first state and a length of a second period of the second state to be different from each other.

In an embodiment of the disclosure, a driving method of a light source includes causing a first current value output by the drive circuit in the first state and a second current value output by the drive circuit in the second state to be different from each other.

According to the disclosure, a light source and a driving method of a light source in which the desired chromaticity is inexpensively obtained can be provided.

DETAILED DESCRIPTION

Figure 1A:
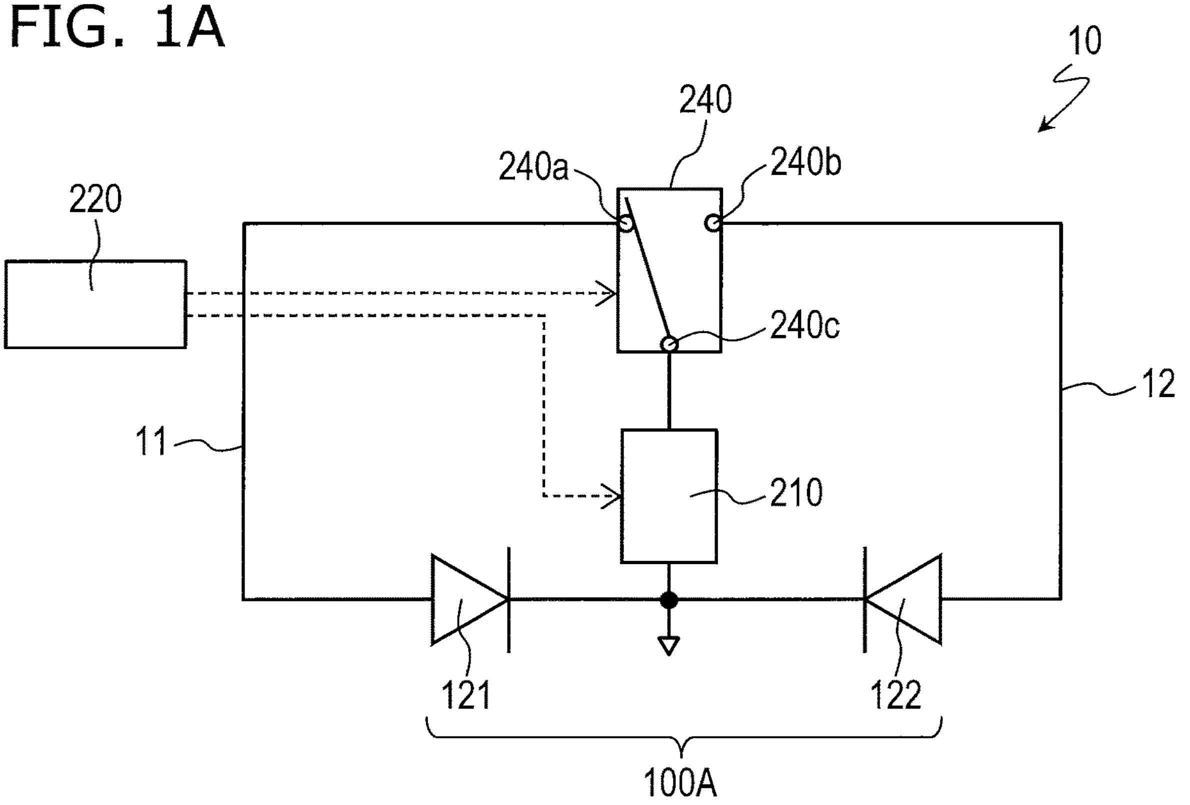
FIGS. 1A and 1B are equivalent circuit diagrams of a light source according to an embodiment.

Exemplary embodiments of the disclosure will now be described in detail with reference to the drawings. The embodiments described below are examples; and the light sources and methods for driving light sources according to the disclosure are not limited to the embodiments described below. For example, the numerical values, shapes, materials, and the like illustrated in the embodiments described below are merely examples; and various modifications are possible within the limits of technical feasibility. The embodiments described below are merely illustrations; and various combinations are possible within the limits of technical feasibility.

The dimensions, shapes, and the like of the components shown in the drawings may be exaggerated for better understanding, and sometimes do not reflect the dimensions, shapes, and size relationships between the components of the actual light source. Some components may be omitted from the schematic illustrations to avoid excessive complexity of the drawings.

In the following description, components that have substantially the same function may be shown using common reference numerals; and a description may be omitted. In the following description, terms that indicate specific directions or positions (e.g., "up", "down", "right", "left", and other terms including such terms) may be used. Such terms, however, merely indicate relative directions or positions in the referenced drawings for convenience. The use of such terms is not intended to limit the orientation when using the light sources of the disclosure. For example, arrangements of components in actual products, drawings other than the present disclosure, and the like are not necessarily the same as those in the drawings referenced in the present disclosure as long as the relationships of the relative directions or positions indicated by terms such as "up", "down", etc., used with reference to the drawings.

Unless otherwise noted in the disclosure, "parallel" includes the case where two straight lines, sides, surfaces, etc., are in a range of about ±5°. Unless otherwise noted in the disclosure, "perpendicular" or "orthogonal" includes the case where two straight lines, sides, surfaces, etc., are in a range of about 90°±5°.

For convenience of description in the drawings of the disclosure, arrows that indicate an X-direction, a Y-direction, and a Z-direction also are illustrated. The X-direction, the Y-direction, and the Z-direction are orthogonal to each other. In the specification, the Y-direction may be called a first direction; the X-direction may be called a second direction; and the Z-direction may be called a third direction.

Light Source

Figure 1B:
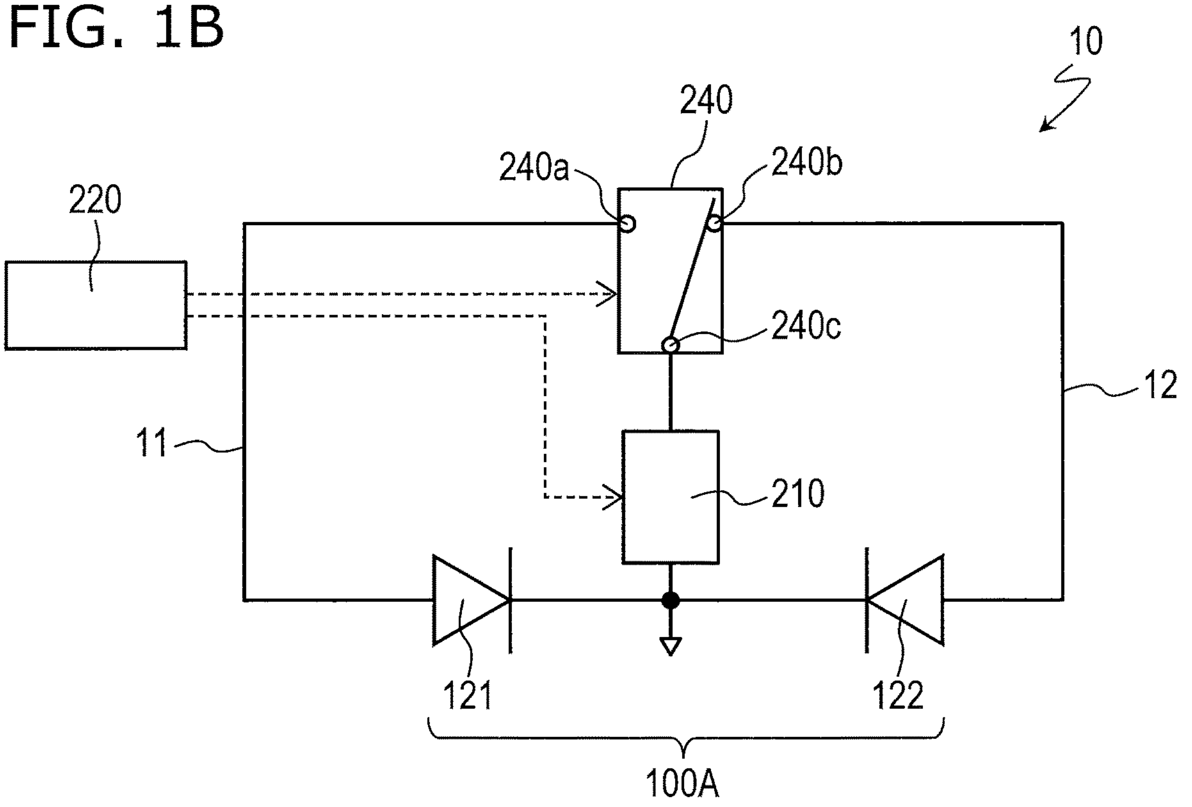

As shown in FIGS. 1A and 1B, a light source 10 according to an embodiment includes a light-emitting device 100A, a drive circuit 210, a switch 240, and a timing controller 220.

Figure 3:
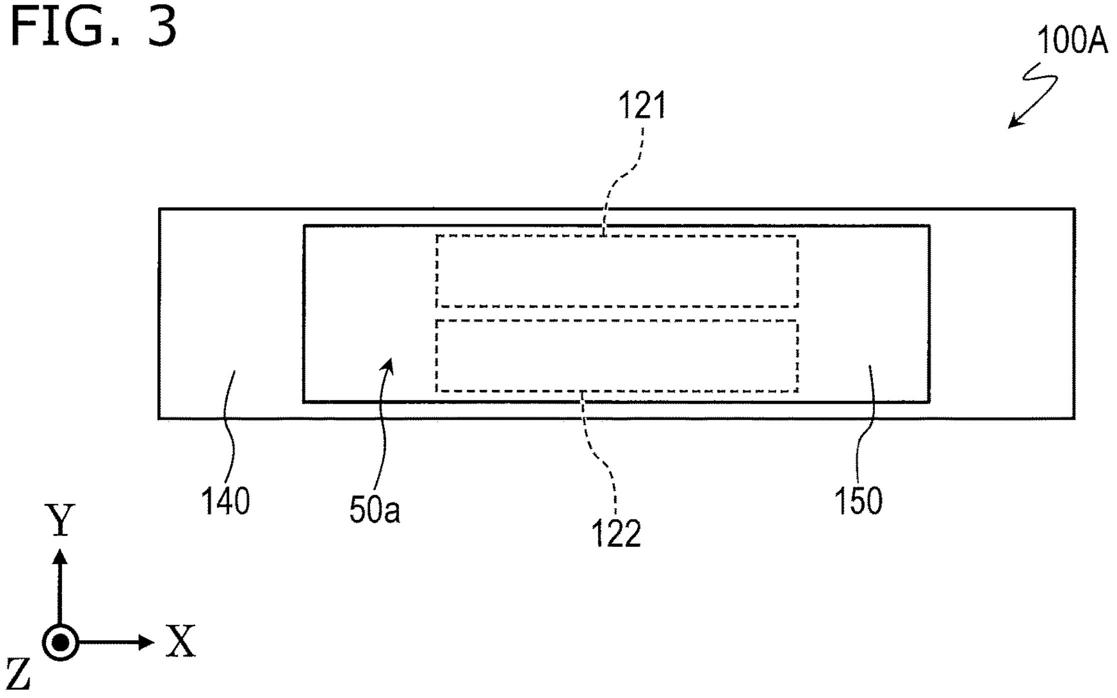
FIG. 3 is a schematic front view of a light-emitting device according to the embodiment.

As shown in FIG. 3, the light-emitting device 100A includes a substrate, and a first light-emitting element 121 and a second light-emitting element 122 located on the substrate. The first light-emitting element 121 and the second light-emitting element 122 are LED (Light-Emitting Diode) elements that are configured to emit light by currents supplied from the drive circuit 210. The first light-emitting element 121 has a light emission peak wavelength in a first wavelength region. The second light-emitting element 122 has a light emission peak wavelength in a second wavelength region at a longer wavelength side than the first wavelength region. The light emission peak wavelength of the first light-emitting element 121 is 430 nm or greater and less than 490 nm; and the first light-emitting element 121 is a blue LED element that emits mainly blue light. The light emission peak wavelength of the second light-emitting element 122 is 490 nm or greater and less than 570 nm; and the second light-emitting element 122 is a green LED element that emits mainly green light. According to such a light emission peak wavelength selection, it is possible to exhibit relatively steep peaks in both the blue and green wavelength regions of the light emission spectrum; for example, a wide color gamut can be realized when applying to the backlight of a display device. By combining with a wavelength conversion member described below, an even wider color gamut can be realized; and the light-emitting device 100A can emit white light. Other detailed descriptions of the light-emitting device 100A are provided below.

A current to drive the light-emitting device 100A is supplied to the light-emitting device 100A by the drive circuit 210. For example, a part of the drive circuit 210 can be realized as an LED driver IC. As shown in FIGS. 1A and 1B, the first light-emitting element 121 and the second light-emitting element 122 are connected in parallel with a single drive circuit 210. The cathode of the first light-emitting element 121 and the cathode of the second light-emitting element 122 are grounded and in a cathode common connection. Although the drive circuit 210 and the switch 240 are located at the anode side of the first and second light-emitting elements 121 and 122 as shown in FIGS. 1A and 1B, the drive circuit 210 and the switch 240 can be located at the cathode side of the first and second light-emitting elements 121 and 122. Even when the first light-emitting element 121 and the second light-emitting element 122 are configured in series, the first light-emitting element 121 and the second light-emitting element 122 can be similarly selectively driven by one drive circuit 210 by switching with the switch 240 provided at the connection part of the light-emitting elements.

The switch 240 includes a first terminal 240*a* connected with the anode of the first light-emitting element 121 via a wiring part 11, a second terminal 240*b* connected with the anode of the second light-emitting element 122 via a wiring part 12, and a third terminal 240*c* connected with the drive circuit 210. A semiconductor element can be used as the switch 240.

FIG. 1A shows a first state in which the first light-emitting element 121 is electrically connected with the drive circuit 210 via the switch 240. In the first state, the first terminal 240*a* and the third terminal 240*c* are electrically connected; a current is supplied from the drive circuit 210 to only the first light-emitting element 121 via the switch 240 and the wiring part 11; and the first light-emitting element 121 emits light. In the first state, a current is not supplied from the drive circuit 210 to the second light-emitting element 122; and the second light-emitting element 122 does not emit light.

FIG. 1B shows a second state in which the second light-emitting element 122 is electrically connected with the drive circuit 210 via the switch 240. In the second state, the second terminal 240*b* and the third terminal 240*c* are electrically connected; a current is supplied from the drive circuit 210 to only the second light-emitting element 122 via the switch 240 and the wiring part 12; and the second light-emitting element 122 emits light. In the second state, a current is not supplied from the drive circuit 210 to the first light-emitting element 121; and the first light-emitting element 121 does not emit light.

The timing controller 220 is configured to control the timing of the operation of the switch 240. In other words, the switch 240 is controlled to switch between the first state and the second state by the timing controller 220. The first state and the second state are alternately repeated. The timing controller 220 is also configured to control the operation of the drive circuit 210. A semiconductor element can be used as the timing controller 220.

Method for Driving Light Source

A driving method of the light source according to the embodiment will now be described with reference to FIGS. 2A and 2B.

When the switch 240 is switched between the first state and the second state by the control by the timing controller 220, each of the first light-emitting element 121 and the second light-emitting element 122 emits light. Examples of the control method include various methods such as, for example, the following methods.

With a configuration in which the timing controller 220 controls the switch 240 to perform switching, the length of a first period $t_B$ of the first state and the length of a second period $t_G$ of the second state can be caused to be different from each other. Alternatively, with a configuration in which the timing controller 220 controls the switch 240 to perform switching, a first current value $I_B$ supplied by the drive circuit 210 to the first light-emitting element 121 in the first period $t_B$ of the first state and a second current value $I_G$ supplied by the drive circuit 210 to the second light-emitting element 122 in the second period $t_G$ of the second state can be caused to be different from each other.

Figure 2A:
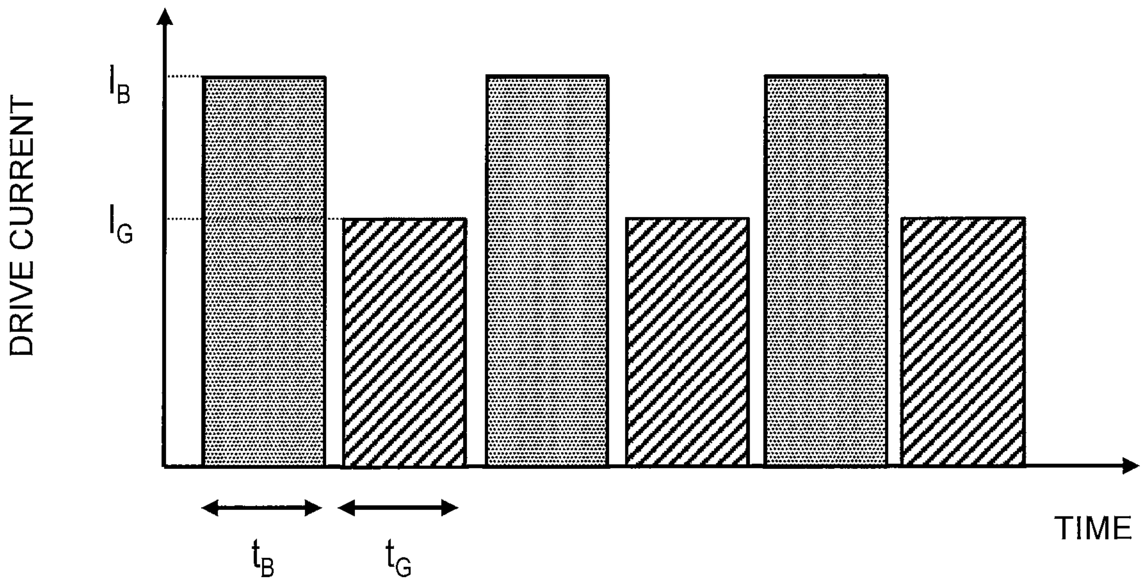
FIGS. 2A and 2B are timing charts of drive currents of a driving method of the light source according to the embodiment.

For example, as shown in FIG. 2A, light of the desired chromaticity can be obtained by causing the first current value $I_B$ and the second current value $I_G$ to be different and by causing the length of the first period $t_B$ of the first state and the length of the second period $t_G$ of the second state to be equal ($t_B$=$t_G$). For example, the first current value $I_B$ can be set to 24 mA. For example, the second current value $I_G$ can be set to 16 mA. For example, the first period $t_B$ and the second period $t_G$ can be set to be not less than 0.02 milliseconds and not more than 5 milliseconds. More favorably, the first period $t_B$ and the second period $t_G$ can be set to be not less than 0.5 milliseconds and not more than 2 milliseconds. By setting such periods, the light source can be used in a backlight that can be perceived as emitting white light when viewed by the eye of a human.

Figure 2B:
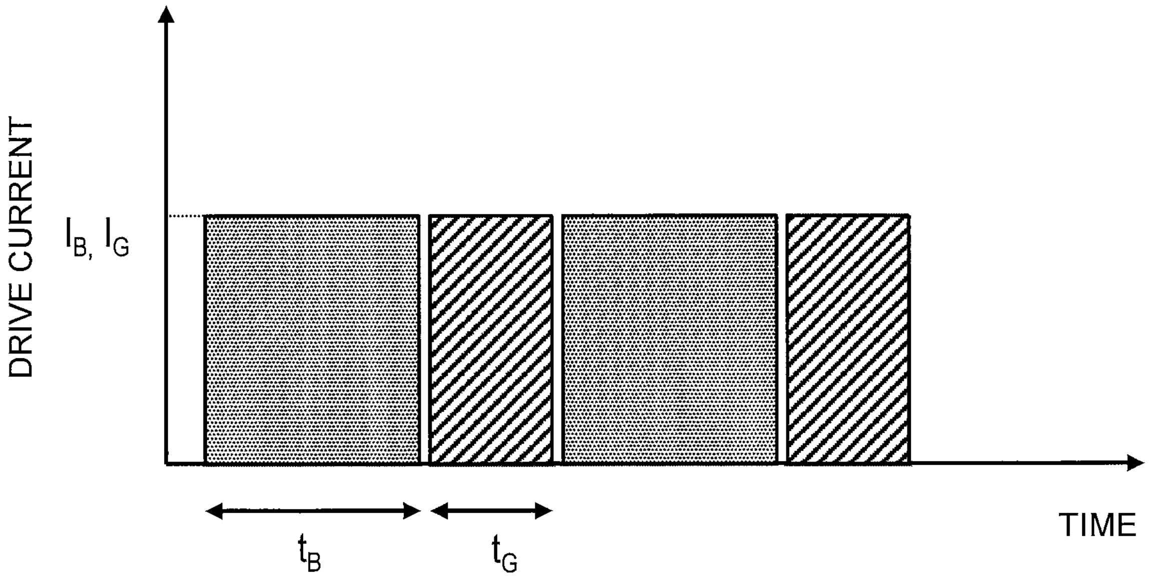

For example, as shown in FIG. 2B, the first current value $I_B$ and the second current value $I_G$ can be caused to be equal (e.g., $I_B$=$I_G$=40 mA); and the length of the first period $t_B$ of the first state (e.g., 1.8 milliseconds) and the length of the second period $t_G$ of the second state (e.g., 1.2 milliseconds) can be caused to be different. Examples of the ratio of the first period $t_B$ and the second period $t_G$ ($t_B$:$t_G$) include, for example, 3:2. For example, the ratio of the second period $t_G$ to the first period $t_B$($t_G$/$t_B$) can be not less than 0.2 and not more than 1. More favorably, the ratio ($t_G$/$t_B$) can be not less than 0.4 and not more than 0.8. Thus, light of the desired chromaticity can be obtained by adjusting the first period $t_B$ and the second period $t_G$. For example, the first period $t_B$ and the second period $t_G$ can be set to be not less than 0.01 milliseconds and not more than 10 milliseconds. By setting such periods, the light source can be used in a backlight that can be perceived as emitting white light when viewed by the eye of a human.

The first current value $I_B$ and the second current value $I_G$ can be caused to be different while causing the length of the first period $t_B$ and the length of the second period $t_G$ to be different. By the control by the timing controller 220, the drive circuit 210 can perform PWM (Pulse Width Modulation) control of the first and second light-emitting elements 121 and 122. The length of the first period $t_B$ and the length of the second period $t_G$ can be adjusted by PWM control.

When a light source includes a blue LED element and a green LED element, and the blue LED element and the green LED element are connected in series, the desired chromaticity is not obtained because the same power is supplied to the blue LED element and the green LED element. To obtain the desired chromaticity, it is necessary to be able to individually drive the blue LED element and the green LED element. In such a case, it is necessary to prepare two drive circuits for the driver IC for driving the blue LED element and the driver IC for driving the green LED element. According to the light source 10 according to the embodiment, by including the switch 240 and the timing controller 220, both the first light-emitting element 121 which is a blue LED element and the second light-emitting element 122 which is a green LED element can be driven by one drive circuit 210. As a result, the light source 10 can be smaller and less expensive. Also, there are cases in which the chromaticity of the light source 10 changes due to a change of the luminance and/or a change of the ambient temperature of the first and second light-emitting elements 121 and 122. In the light source 10, the driving parameters can be easily modified according to the change of the luminance and/or ambient temperature, which can facilitate emission of white light of the desired chromaticity.

As described below, gallium nitride materials are used as the materials of the green and blue LED elements; generally, the In (indium) composition ratio in the active layer of the green LED element is greater than the In composition ratio in the active layer of the blue LED element. As a result, a forward voltage $Vf_G$ when the green LED element emits light tends to be greater than a forward voltage $Vf_B$ when the blue LED element emits light. In such a case, if one drive circuit 210 used in combination with the switch 240 and the timing controller 220 described above is a drive circuit that can drive the green LED element that has a higher forward voltage, the drive circuit also can drive the blue LED element. However, the driver IC for driving the green LED element having the higher forward voltage requires a higher breakdown voltage than the driver IC for driving blue LED element; and the driver IC for driving the green LED element tends to be more expensive than the driver IC for driving the blue LED element. The light source becomes expensive when the driver IC for the green LED element, which is more expensive than the driver IC for the blue LED element, is used as the drive circuit 210 described above.

The forward voltage $Vf_G$ of the green LED element can be set to be less than the forward voltage $Vf_B$ of the blue LED element because the energy of photons of green light is less than the energy of photons of blue light. Therefore, according to the embodiment, the element used as the second light-emitting element 122 is a green LED element that is made by optimizing particularly the epitaxial crystal growth process and has a lower forward voltage than a general blue LED element; and a general blue LED element is used as the first light-emitting element 121. In other words, the forward voltage $Vf_G$ of the second light-emitting element 122, which is a green LED element, is less than the forward voltage $Vf_B$ of the first light-emitting element 121, which is a blue LED element. For example, while the forward voltage $Vf_B$ of the first light-emitting element 121 at 65 A/cm is about 3 V, the forward voltage $Vf_G$ of the second light-emitting element 122 at 65 A/cm can be about 2.6 V. As a result, a general driver IC that is mass-produced for blue LED elements can be used as the drive circuit 210 driving both the first and second light-emitting elements 121 and 122; and a light source that provides the desired chromaticity can be inexpensive.

Light-Emitting Device

A light-emitting device according to the embodiment will now be described in detail.

Figure 4:
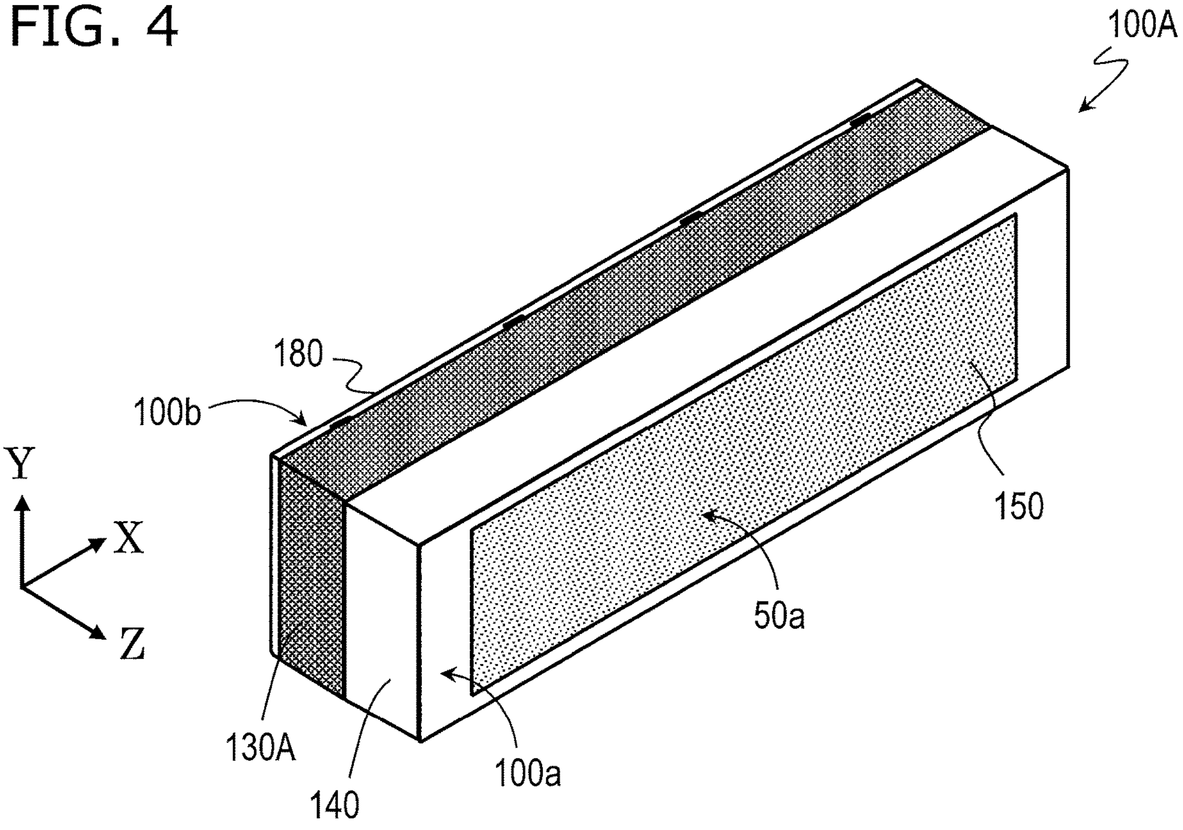
FIGS. 4 and 5 are schematic perspective views of the light-emitting device according to the embodiment.
Figure 5:
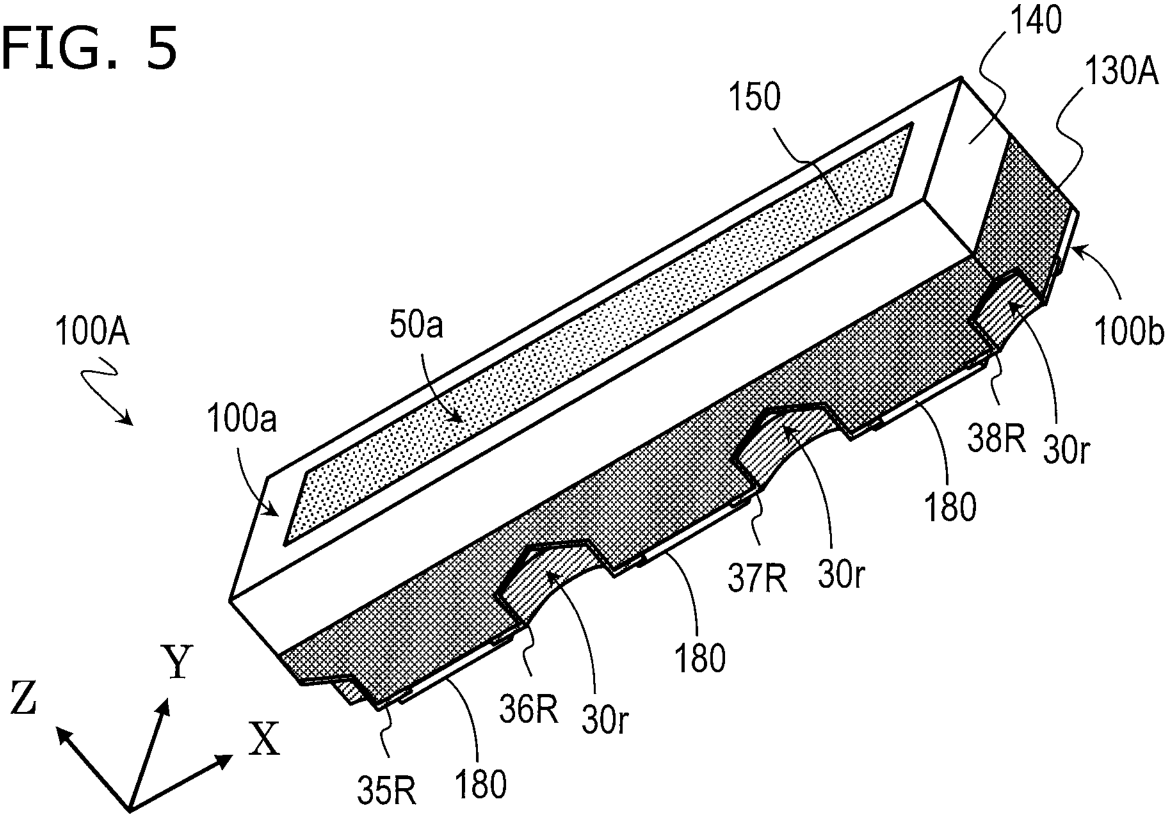

FIGS. 4 and 5 show an example of the appearance of the light-emitting device according to the embodiment of the disclosure. The light-emitting device 100A shown in FIGS. 4 and 5 has a substantially rectangular parallelepiped shape that is long in the X-direction. The light-emitting device 100A includes a front surface 100*a* parallel to the XY-plane. The front surface 100*a* of the light-emitting device 100A has a rectangular shape that is longer in the X-direction than the Y-direction. The light-emitting device 100A can be used as a side-emitting light-emitting device in a light source for a backlight in which light enters a light guide plate from the side surface of the light guide plate.

The light-emitting device 100A includes the substrate 130A, a light-reflective member 140, and a light-transmitting member 150. As described below, the light-transmitting member 150 can include a wavelength conversion member such as a phosphor, etc. As shown in FIGS. 4 and 5, the light-transmitting member 150 includes a light extraction surface 50*a* parallel to the XY-plane. Here, the light extraction surface 50*a* is a portion of the front surface 100*a*. The light-reflective member 140 is positioned around the light extraction surface 50*a*.

Figure 6:
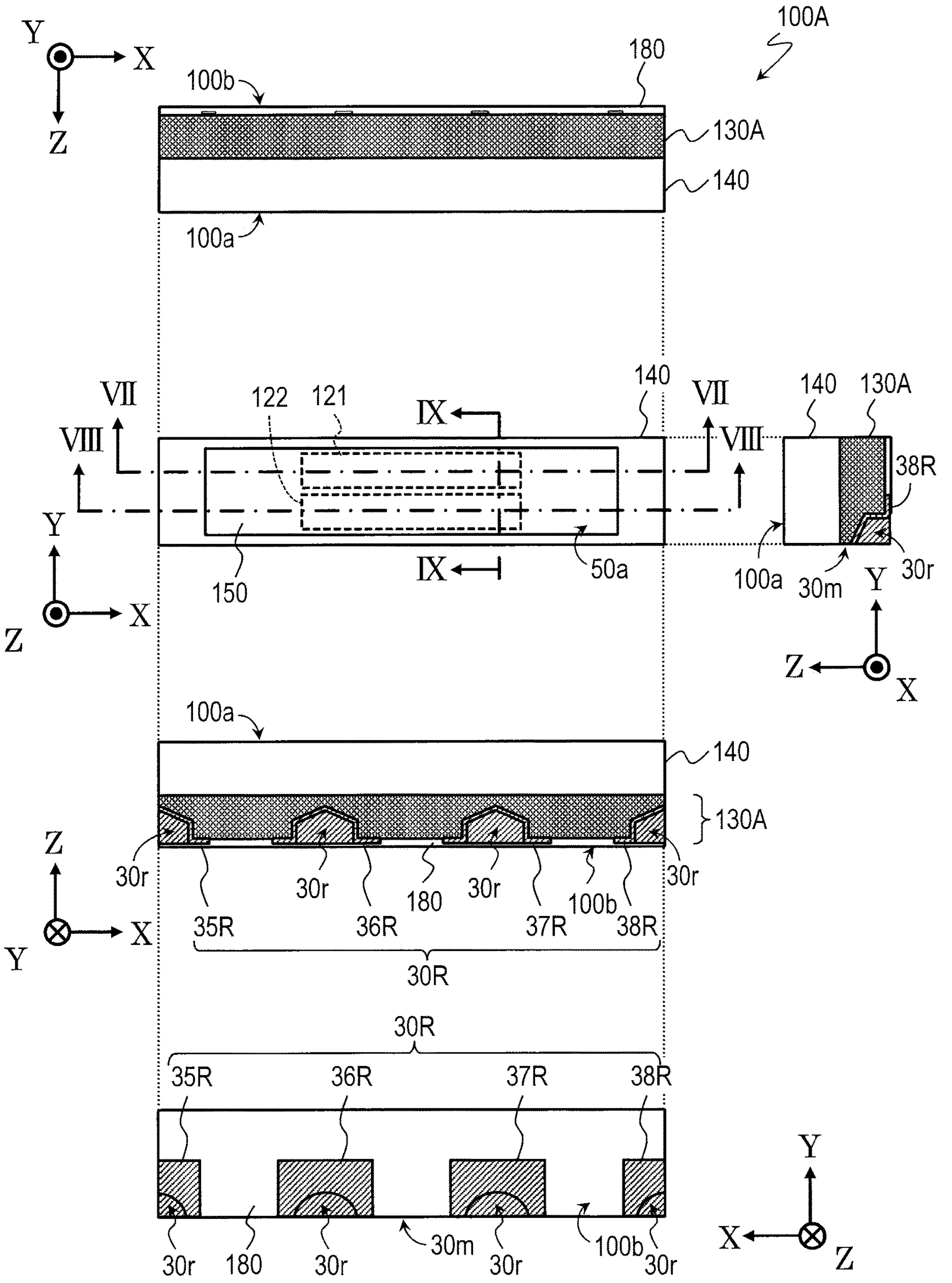
FIG. 6 is a schematic view of the light-emitting device according to the embodiment from multiple viewpoints.

In FIG. 6, the appearances of the light-emitting device 100A when viewed in the +Y direction, the +Z direction, the −Y direction, the −Z direction, and the +X direction in FIG. 6. are collectively shown in a single drawing. The light-emitting device 100A includes a lower surface wiring part 30R at a back surface 100*b* side at the side opposite to the front surface 100*a*. In the configuration illustrated in FIG. 6, the lower surface wiring part 30R includes a total of four wiring parts, i.e., a fifth wiring part 35R, a sixth wiring part 36R, a seventh wiring part 37R, and an eighth wiring part 38R. The fifth wiring part 35R, the sixth wiring part 36R, the seventh wiring part 37R, and the eighth wiring part 38R are arranged in one column along the X-direction (a second direction) with spacing between adjacent ones of them. In the example, an insulating layer 180 is provided at the back surface 100*b* of the light-emitting device 100A to prevent short-circuits between two mutually-adjacent terminals.

According to the embodiment of the disclosure, the first light-emitting element 121 and the second light-emitting element 122 are arranged in the light-emitting device 100A in one column along the Y-direction (a first direction). In the example shown in FIG. 6, the first light-emitting element 121 is positioned at the +Y direction side of FIG. 6 (the upper side in the state in which the light-emitting device 100A is mounted to a wiring substrate or the like) with respect to the second light-emitting element 122. However, the arrangement of the first and second light-emitting elements 121 and 122 in the light-emitting device 100A is not limited to the example shown in FIG. 6.

Figure 7:
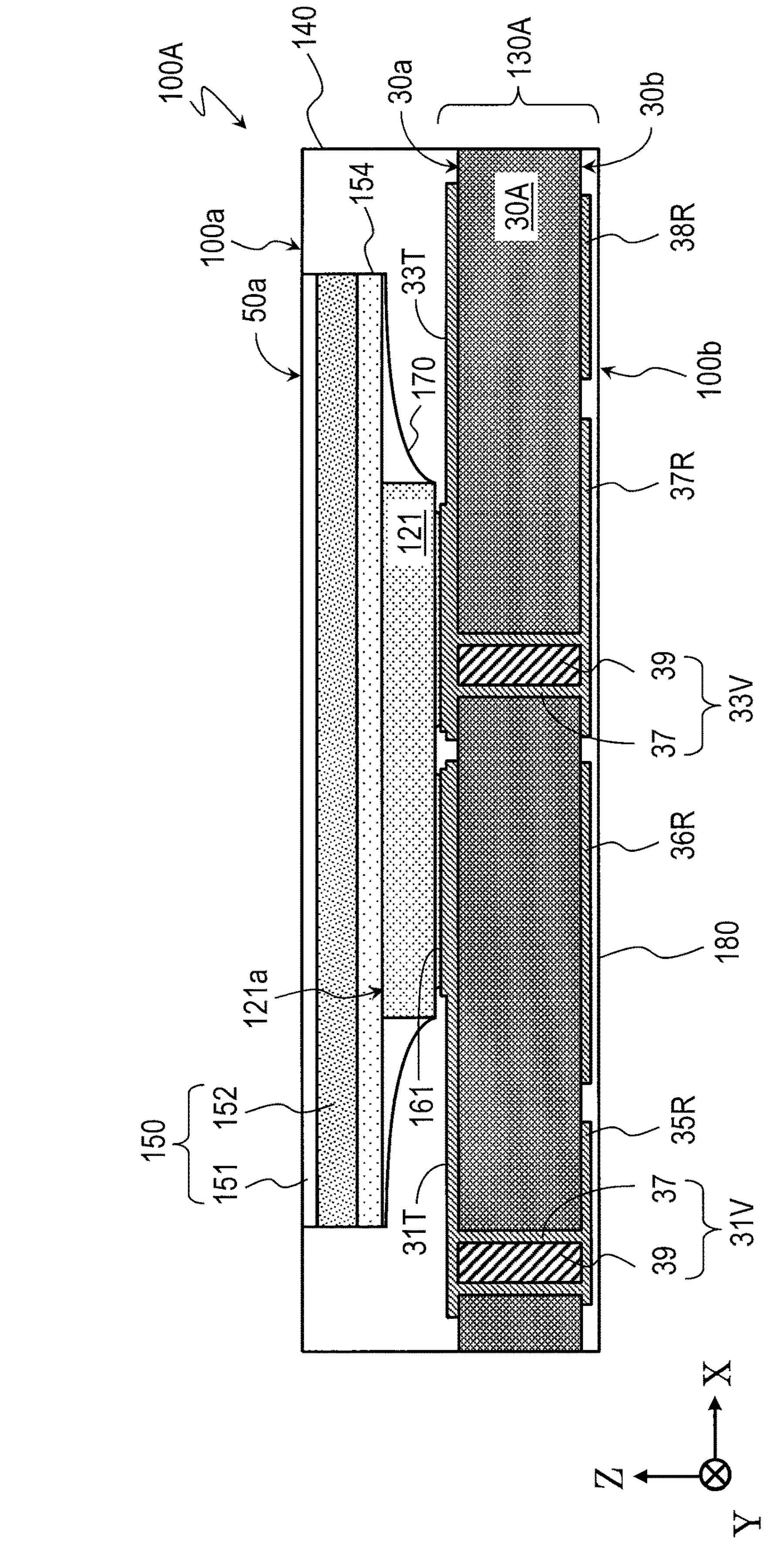
FIG. 7 is a schematic view showing a VII-VII cross section of FIG. 6.
Figure 8:
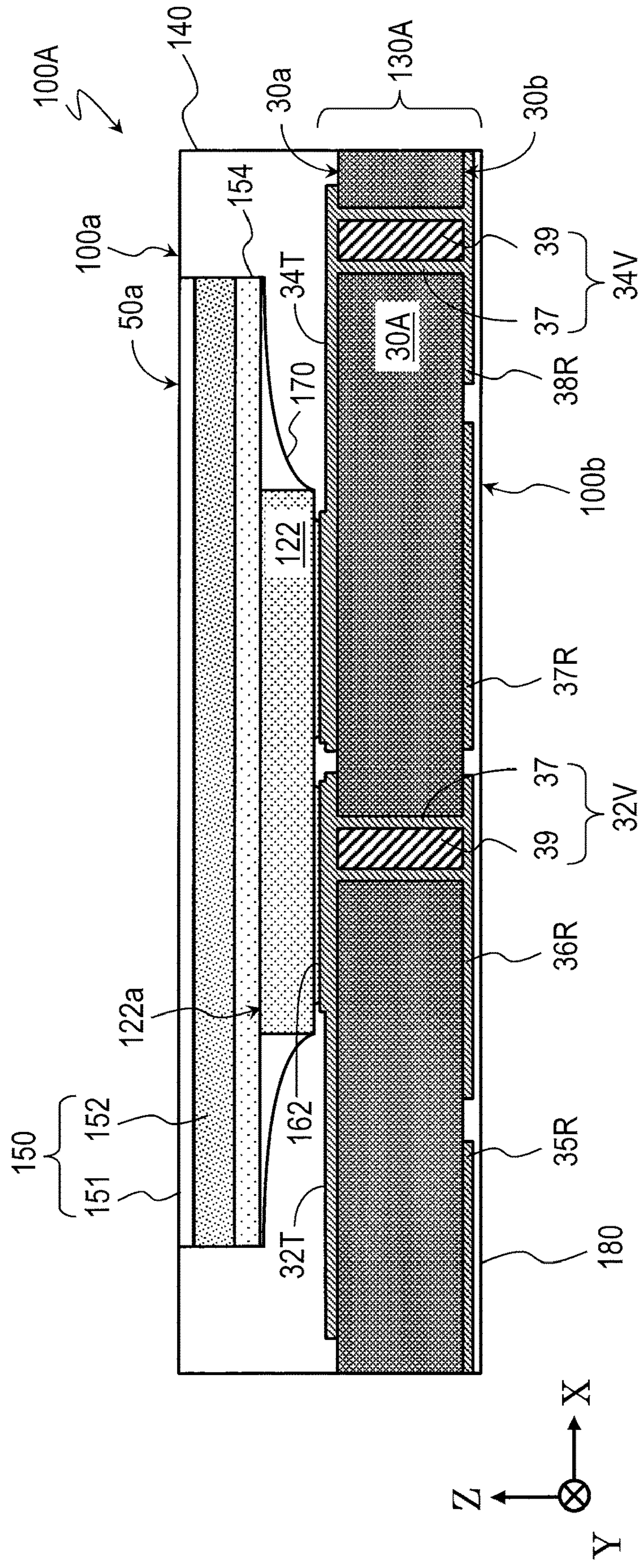
FIG. 8 is a schematic view showing a VIII-VIII cross section of FIG. 6.
Figure 9:
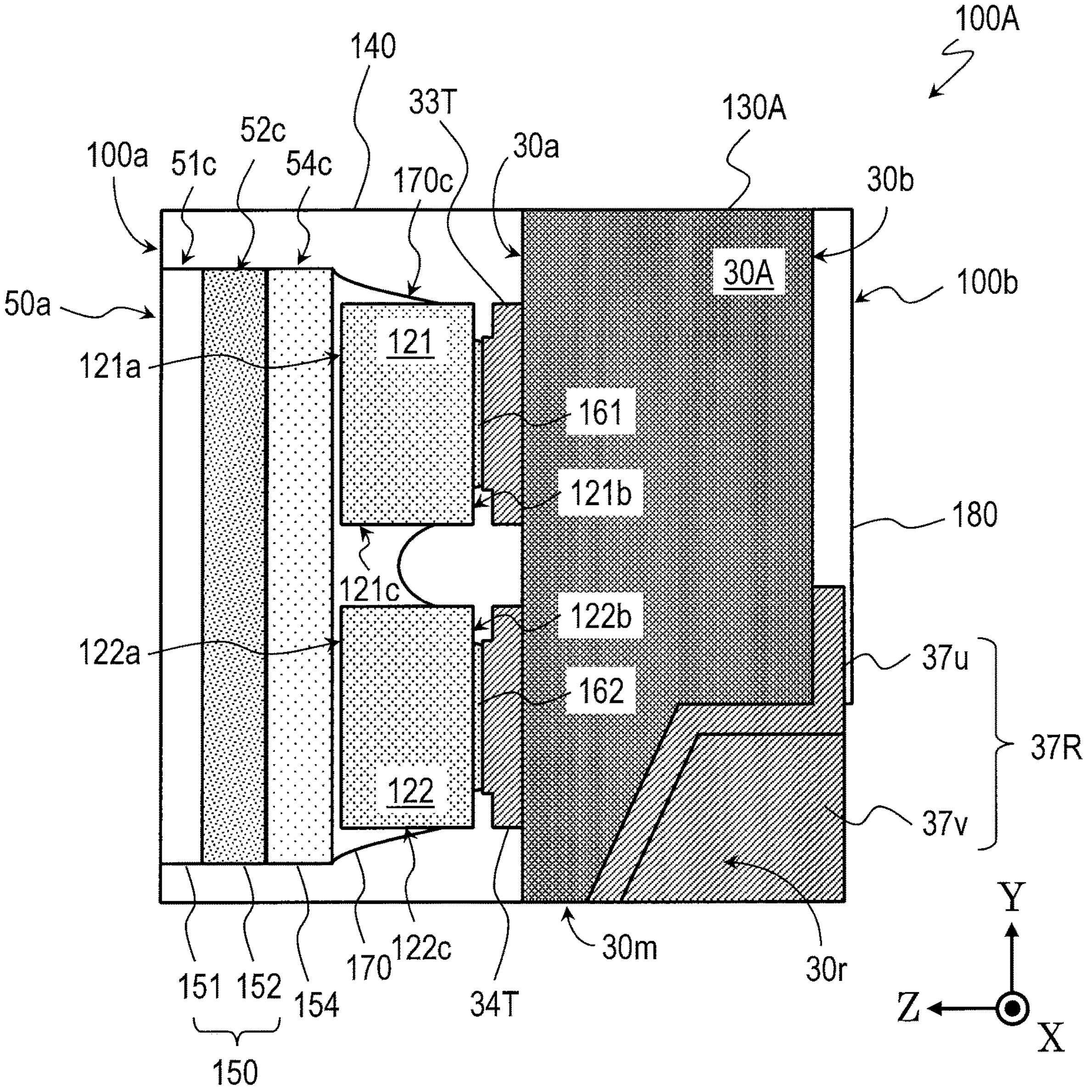
FIG. 9 is a schematic view showing a IX-IX cross section of FIG. 6.

FIG. 7 is a VII-VII cross section of FIG. 6. FIG. 8 is a VIII-VIII cross section of FIG. 6. FIG. 9 is a IX-IX cross section of FIG. 6. The substrate 130A includes an upper surface having a rectangular shape defined by a short side extending in the Y-direction (the first direction) and a long side extending in the X-direction (the second direction). The substrate 130A includes an insulating base member 30A, an upper surface wiring part, and the lower surface wiring part 30R described above. The base member 30A includes an upper surface 30*a*, and a lower surface 30*b* positioned at the side opposite to the upper surface 30*a*. The upper surface wiring part is positioned on the upper surface 30*a* of the base member 30A. The upper surface of the substrate 130A includes the upper surface 30*a* of the base member 30A and the upper surface of the upper surface wiring part. The lower surface wiring part 30R is positioned at the lower surface 30*b* of the base member 30A.

The upper surface wiring part includes four wiring parts, i.e., first to fourth wiring parts 31T to 34T. As shown in FIG. 7, the substrate 130A includes the first wiring part 31T and the third wiring part 33T positioned at the upper surface 30*a*. As shown in FIG. 8, the substrate 130A also includes the second wiring part 32T and the fourth wiring part 34T positioned at the upper surface 30*a*.

The substrate 130A further includes, inside the base member 30A, multiple conductive parts that reach the lower surface 30*b* from the upper surface 30*a* of the base member 30A and connect the upper surface wiring parts and the lower surface wiring parts. According to the embodiment, four conductive parts, i.e., a first conductive part 31V, a second conductive part 32V, a third conductive part 33V, and a fourth conductive part 34V, are located inside the base member 30A.

As shown in FIG. 7, the first conductive part 31V connects the first wiring part 31T and the fifth wiring part 35R and electrically connects the first wiring part 31T and the fifth wiring part 35R to each other. The third conductive part 33V connects the third wiring part 33T and the seventh wiring part 37R and electrically connects the third wiring part 33T and the seventh wiring part 37R to each other. According to the embodiment, among the first conductive part 31V and the third conductive part 33V, the third conductive part 33V is positioned below the first light-emitting element 121.

As shown in FIG. 8, the second conductive part 32V connects the second wiring part 32T and the sixth wiring part 36R and electrically connects the second wiring part 32T and the sixth wiring part 36R to each other. The fourth conductive part 34V connects the fourth wiring part 34T and the eighth wiring part 38R and electrically connects the fourth wiring part 34T and the eighth wiring part 38R to each other. According to the embodiment, among the second conductive part 32V and the fourth conductive part 34V, the second conductive part 32V is positioned below the second light-emitting element 122.

Figure 10:
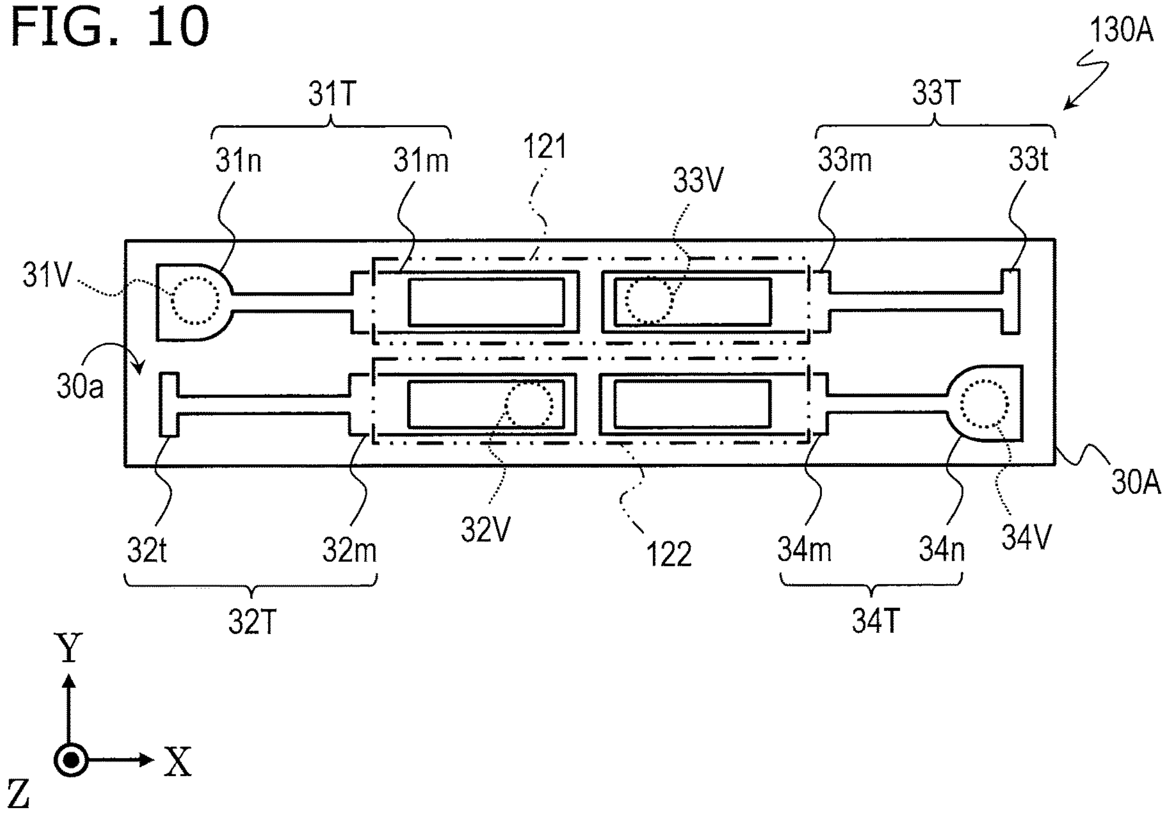
FIG. 10 is a schematic plan view showing the substrate removed from the light-emitting device shown in FIGS. 4 and 5.
Figure 11:
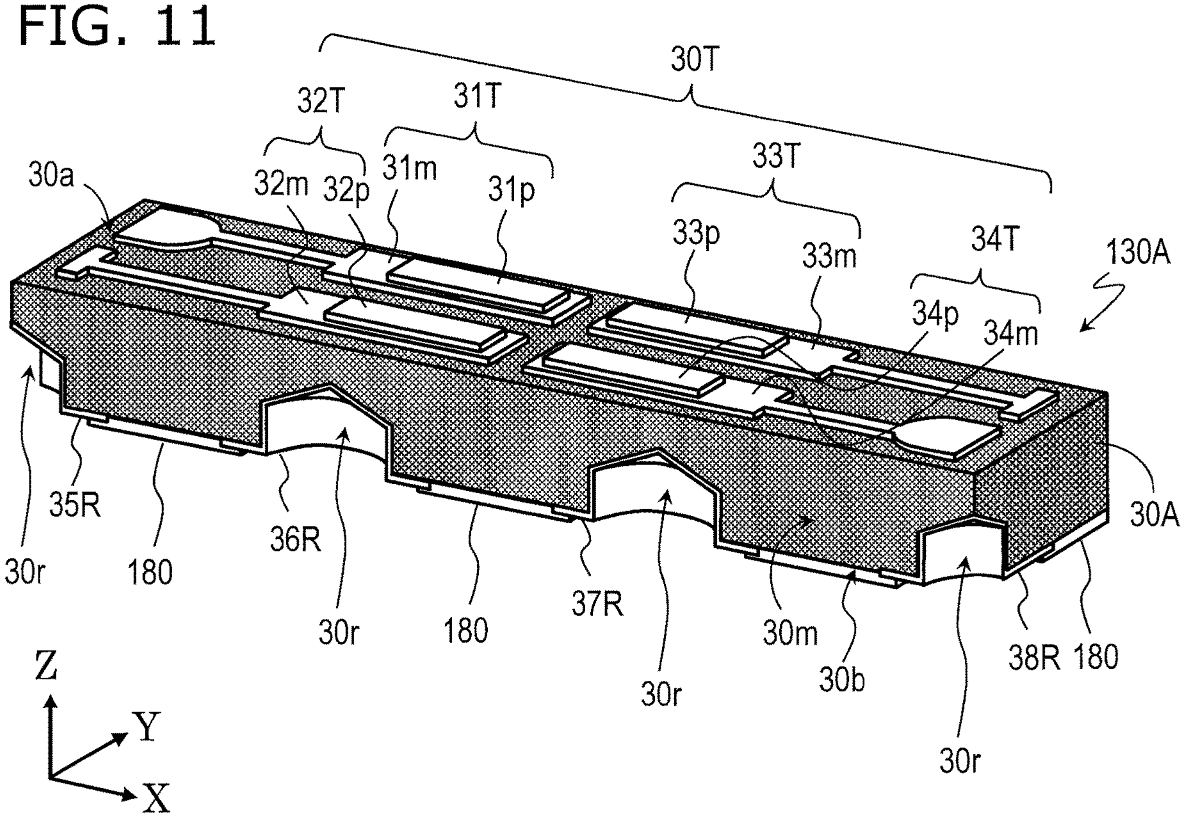
FIG. 11 is a schematic perspective view showing the substrate removed from the light-emitting device shown in FIGS. 4 and 5.

FIGS. 10 and 11 schematically show the substrate 130A removed from the light-emitting device 100A. FIG. 10 corresponds to a plan view in which the substrate 130A is viewed in the Z-direction from the upper surface 30*a* side of the base member 30A. As shown in FIG. 10, the upper surface 30*a* of the base member 30A has a rectangular shape that is longer in the X-direction than the Y-direction. Here, the short side of the rectangular shape of the upper surface 30*a* is parallel to the Y-direction; and the long side of the rectangular shape of the upper surface 30*a* is parallel to the X-direction.

As shown in FIG. 11, the substrate 130A includes an upper surface wiring part 30T at the upper surface 30*a* of the base member 30A. According to the embodiment, the upper surface wiring part 30T includes the first wiring part 31T, the second wiring part 32T, the third wiring part 33T, and the fourth wiring part 34T; and the first wiring part 31T, the second wiring part 32T, the third wiring part 33T, and the fourth wiring part 34T each have shapes that are long in the X-direction. As shown in FIG. 10, the first wiring part 31T, the second wiring part 32T, the third wiring part 33T, and the fourth wiring part 34T are arranged in two rows and two columns with spacing between adjacent ones of them at the upper surface 30*a* of the base member 30A. More specifically, the first wiring part 31T and the second wiring part 32T are adjacent along the Y-direction with a spacing therebetween; and the third wiring part 33T and the fourth wiring part 34T are adjacent along the Y-direction with a spacing therebetween. The first wiring part 31T and the third wiring part 33T are adjacent along the X-direction with a spacing interposed; and the second wiring part 32T and the fourth wiring part 34T are adjacent along the X-direction with a spacing interposed.

In the configuration illustrated in FIG. 10, the first wiring part 31T includes a rectangular land 31*m*, and a land 31*n* positioned at the end portion at the side opposite to the land 31*m*. The third wiring part 33T includes a rectangular land 33*m*, and a T-shaped part 33*t* positioned at the end portion at the side opposite to the land 33*m*. As understood from FIGS. 7 and 10, the first light-emitting element 121 is located at the upper surface 30*a* of the base member 30A on these wiring parts to straddle the first wiring part 31T and the third wiring part 33T adjacent in the X-direction. The first light-emitting element 121 is electrically connected to the land 31*m* of the first wiring part 31T and the land 33*m* of the third wiring part 33T by a bonding member 161 such as solder, etc.

The second wiring part 32T includes a rectangular land 32*m*, and a T-shaped part 32*t* positioned at the end portion at the side opposite to the land 32*m*; and the fourth wiring part 34T includes a rectangular land 34*m*, and a land 34*n* positioned at the end portion at the side opposite to the land 34*m*. As understood from FIGS. 8 and 10, the second light-emitting element 122 is located on these wiring parts to straddle the second wiring part 32T and the fourth wiring part 34T adjacent in the X-direction. The second light-emitting element 122 is electrically connected to the land 32*m* of the second wiring part 32T and the land 34*m* of the fourth wiring part 34T by a bonding member 162 such as solder, etc.

The arrangement of the conductive parts in the base member 30A will now be described. As schematically shown in FIG. 10, when viewed in plan, the third conductive part 33V is positioned to overlap the land 33*m* of the third wiring part 33T, and is positioned to overlap the first light-emitting element 121. Similarly, the second conductive part 32V is positioned to overlap the land 32*m* of the second wiring part 32T, and is positioned to overlap the second light-emitting element 122. In contrast, when viewed in plan, the first conductive part 31V is positioned to overlap the land 31*n* of the first wiring part 31T. The first conductive part 31V does not overlap the first light-emitting element 121, but instead overlaps the light-reflective member 140. In other words, according to the embodiment as shown in FIG. 7, the first conductive part 31V is positioned below the light-reflective member 140. Similarly, as schematically shown in FIG. 10, the fourth conductive part 34V is positioned to overlap the land 34*n* of the fourth wiring part 34T, but does not overlap the second light-emitting element 122. Instead, the fourth conductive part 34V overlaps the light-reflective member 140. According to the embodiment as shown in FIG. 8, the fourth conductive part 34V also is positioned below the light-reflective member 140.

In the configuration illustrated in FIG. 11, the first wiring part 31T includes a protrusion 31*p* positioned on the land 31*m*. Similarly, in the example, the second wiring part 32T, the third wiring part 33T, and the fourth wiring part 34T respectively include a protrusion 32*p* on the land 32*m*, a protrusion 33*p* on the land 33*m*, and a protrusion 34*p* on the land 34*m*.

Figure 12:
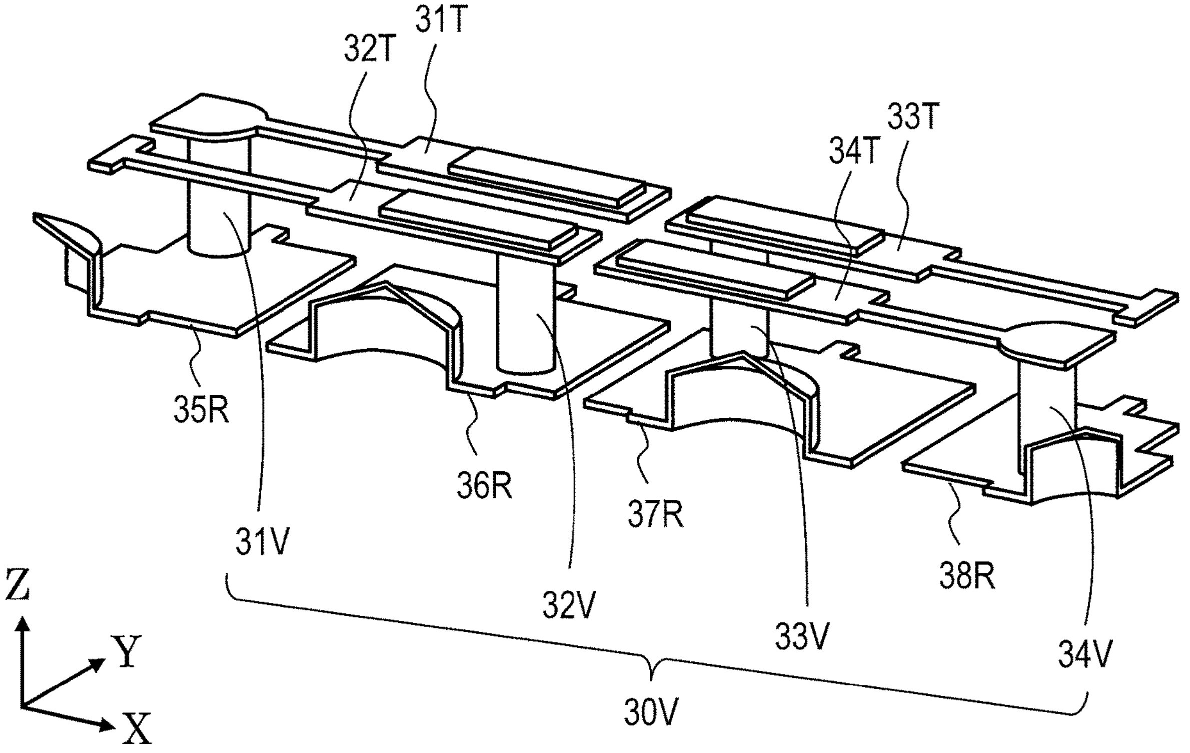
FIG. 12 is a schematic perspective view showing the structure of the substrate shown in FIGS. 10 and 11 without the base member and the insulating layer.

FIG. 12 schematically shows the structure of the substrate 130A shown in FIGS. 10 and 11 without the base member 30A and the insulating layer 180. The substrate 130A includes a conductive part 30V positioned inside the base member 30A. The conductive part 30V in the example shown in FIG. 9 includes the first conductive part 31V, the second conductive part 32V, the third conductive part 33V, and the fourth conductive part 34V. The first wiring part 31T, the second wiring part 32T, the third wiring part 33T, and the fourth wiring part 34T on the upper surface 30*a* of the base member 30A are electrically connected respectively to one corresponding wiring part among the fifth wiring part 35R, the sixth wiring part 36R, the seventh wiring part 37R, and the eighth wiring part 38R by one among the first conductive part 31V, the second conductive part 32V, the third conductive part 33V, and the fourth conductive part 34V.

Here, the fifth wiring part 35R, the sixth wiring part 36R, the seventh wiring part 37R, and the eighth wiring part 38R on the lower surface 30*b* of the base member 30A are arranged in one column along the X-direction with spacing between adjacent ones of them. In the example shown in FIG. 12, the first wiring part 31T, the second wiring part 32T, the third wiring part 33T, and the fourth wiring part 34T are electrically connected respectively to the fifth wiring part 35R, the sixth wiring part 36R, the seventh wiring part 37R, and the eighth wiring part 38R by the first conductive part 31V, the second conductive part 32V, the third conductive part 33V, and the fourth conductive part 34V.

According to the embodiment of the disclosure, the upper surface wiring parts are connected to the lower surface wiring parts by the conductive parts inside the base member. As understood from FIGS. 11 and 12, here, the first conductive part 31V is positioned more proximate to one end of the base member 30A than the second conductive part 32V in the second direction; and the fourth conductive part 34V is positioned more proximate to the other end of the base member 30A than the third conductive part 33V in the second direction. Thus, the first conductive part 31V, the second conductive part 32V, the third conductive part 33V, and the fourth conductive part 34V are dispersed in the base member 30A without bias as much as possible, thereby avoiding concentration of thermal stress in a partial region of the substrate 130A in a reflow process or the like. In other words, bias of the residual stress inside the substrate 130A can be reduced, and the warp and the like of the substrate 130A after reflow can be reduced. For example, as a result of reduced warp of the substrate 130A, delamination of the member (e.g., the light-emitting elements 121 and 122 or the light-reflective member 140) from the substrate 130A can be reduced, and the reliability of the light-emitting device 100A can be increased.

Figure 13:
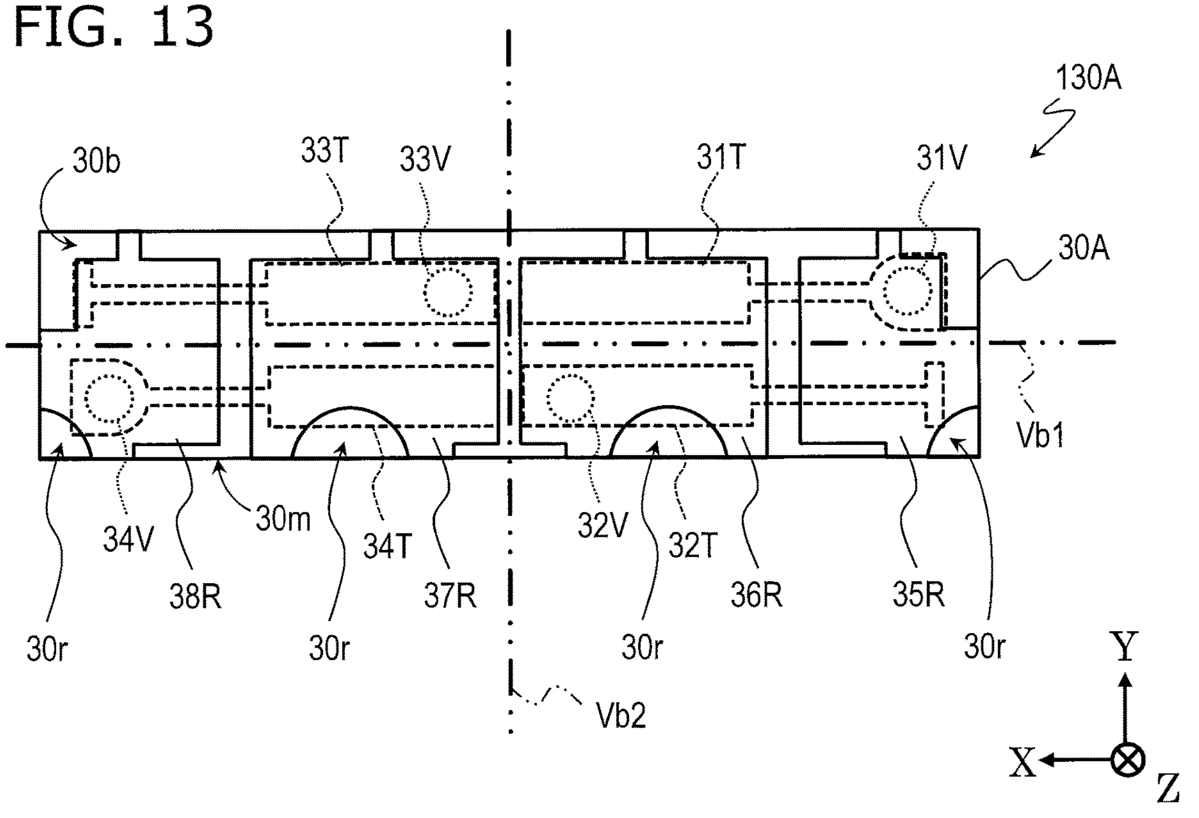
FIG. 13 is a schematic back view for describing the arrangement of lower surface wiring parts of the light-emitting device according to the embodiment.

The arrangement of the conductive parts (i.e., the first conductive part 31V, the second conductive part 32V, the third conductive part 33V, and the fourth conductive part 34V) inside the base member 30A according to the embodiment will now be described in more detail with reference to FIGS. 13 and 14. FIG. 13 shows the illustrative arrangement of the lower surface wiring parts when the substrate 130A is viewed from the back surface 100*b* side of the light-emitting device 100A.

According to the embodiment as described with reference to FIG. 10, the first wiring part 31T, the second wiring part 32T, the third wiring part 33T, and the fourth wiring part 34T have a matrix configuration of two rows and two columns at the upper surface 30*a* of the base member 30A. Here, as shown in FIG. 13, virtual perpendicular bisectors are illustrated on the upper surface 30*a* for two mutually-orthogonal sides of the rectangular shape of the upper surface 30*a* of the base member 30A. In FIG. 13, a perpendicular bisector Vb1 related to the short sides of the rectangular shape of the upper surface 30*a* of the base member 30A and a perpendicular bisector Vb2 related to the long sides of the rectangular shape are illustrated by double dot-dash lines. Each of the first wiring part 31T, the second wiring part 32T, the third wiring part 33T, and the fourth wiring part 34T can be positioned respectively in one of the four regions defined by these perpendicular bisectors.

Otherwise, the fifth wiring part 35R, the sixth wiring part 36R, the seventh wiring part 37R, and the eighth wiring part 38R on the lower surface 30*b* of the base member 30A are arranged in one column along the long sides of the rectangular shape of the upper surface 30*a* of the base member 30A with spacing between adjacent ones of them. According to the embodiment herein, the conductive parts that connect the upper surface wiring parts at the upper surface 30*a* side of the base member 30A and the lower surface wiring parts at the lower surface 30*b* side are located respectively in the four regions (corresponding first to fourth quadrants when the perpendicular bisectors Vb1 and Vb2 are taken as coordinate axes of a two-dimensional Cartesian coordinate system) defined by the perpendicular bisectors Vb1 and Vb2 described above when viewed in plan along the normal direction of the upper surface 30*a* (the Z-direction). Furthermore, according to the embodiment, when viewed in plan along the Z-direction, the conductive parts (i.e., the first conductive part 31V, the second conductive part 32V, the third conductive part 33V, and the fourth conductive part 34V) are arranged "alternately" in the base member 30A. In other words, among the first conductive part 31V and the third conductive part 33V positioned above the perpendicular bisector Vb1 in FIG. 13, the first conductive part 31V is located proximate to the outer edge of the base member 30A, whereas the third conductive part 33V is located proximate to the perpendicular bisector Vb2. Among the second conductive part 32V and the fourth conductive part 34V positioned below the perpendicular bisector Vb1, the fourth conductive part 34V is located proximate to the outer edge of the base member 30A, whereas the second conductive part 32V is located proximate to the perpendicular bisector Vb2.

It is supposed that the arrangement of the third and fourth conductive parts 33V and 34V with respect to a direction along the long side of the rectangular shape of the upper surface 30*a* of the base member 30A is inverted. In other words, it is supposed that, in the direction along the long side of the rectangular shape of the upper surface 30*a*, the third conductive part 33V is located proximate to the outer edge of the base member 30A; and the fourth conductive part 34V is located more proximate to the perpendicular bisector Vb2. In such a case, a relatively wide region without other conductive parts present is formed along the long side of the rectangular shape of the upper surface 30*a* between the first conductive part 31V and the third conductive part 33V. In other words, a slender region occupied by only the material of the base member 30A exists in the substrate 130A.

When such a slender region occupied by an insulating material exists in the substrate 130A, warp of the substrate 130A easily occurs in processes (reflow, etc.) accompanied by heating. In particular, when the arrangement of the third and fourth conductive parts 33V and 34V is inverted with respect to the X-direction, two conductive parts including materials having relatively high thermal conductivities are located at the center vicinity of the lower region of the two regions defined by the perpendicular bisector Vb1; and warp in the Y-direction undesirably occurs easily in the substrate 130A. When extreme warp occurs in the transverse direction of the elongated substrate 130A, there is a possibility that delamination of the members on the substrate 130A such as the light-emitting elements 121 and 122, the light-reflective member 140, etc., can undesirably occur.

In contrast, according to the embodiment of the disclosure, when viewed in plan along the normal direction of the upper surface 30*a* of the base member 30A, the first conductive part 31V, the second conductive part 32V, the third conductive part 33V, and the fourth conductive part 34V are arranged "alternately" in the base member 30A. In the example shown in FIG. 13, the four conductive parts can be said to be arranged to be point-symmetric around the intersection of the perpendicular bisectors Vb1 and Vb2. In other words, in the example shown in FIG. 13, the four conductive parts employ an arrangement that is not line-symmetric with respect to the perpendicular bisector Vb1 or the perpendicular bisector Vb2. By employing such a connection structure between the upper surface wiring parts on the upper surface 30*a* and the lower surface wiring parts on the lower surface 30*b* of the base member 30A, an imbalance of the residual stress in the base member 30A caused by processes accompanied by heating can be reduced. As a result, the warp of the substrate 130A supporting the light-emitting elements 121 and 122 can be reduced, the delamination or detachment of members on the substrate 130A can be reduced, and the reliability of the light-emitting device 100A can be increased.

Figure 14:
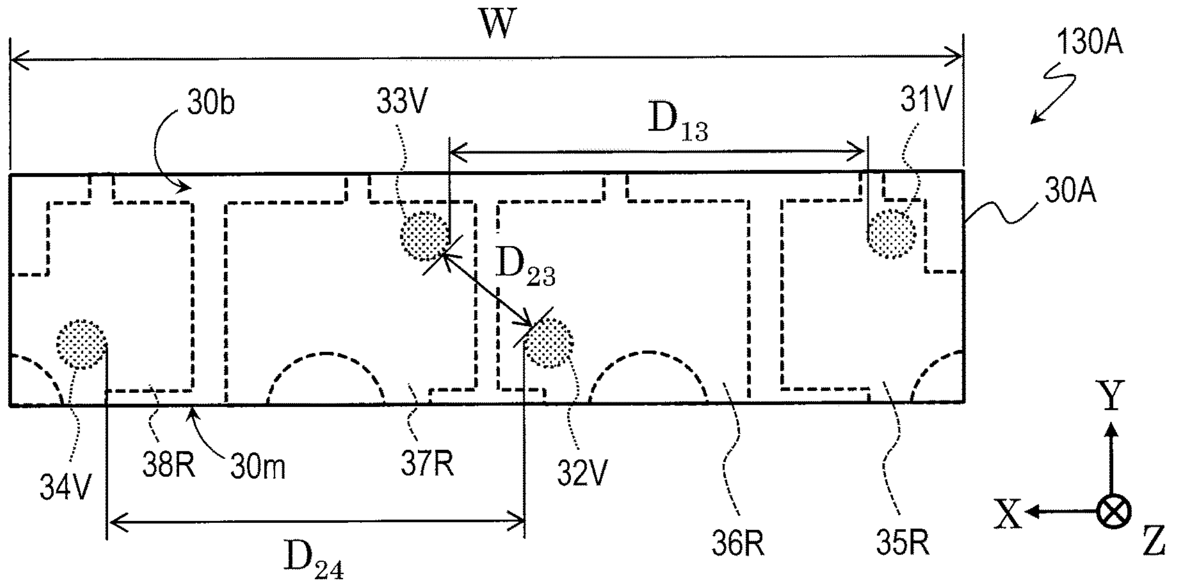
FIG. 14 is a schematic back view for describing an example of the arrangement of the conductive parts inside the base member of the light-emitting device according to the embodiment.

FIG. 14 schematically shows an example of the arrangement of the conductive parts in the base member 30A. Similarly to FIG. 13, FIG. 14 corresponds to a schematic back view when the substrate 130A is viewed from the back surface 100*b* side of the light-emitting device 100A. In the example shown in FIG. 14, the ratio ($D_{13}$/W) of a distance $D_{13}$ to a length W can be, for example, in the range of not less than 0.2 and not more than 0.7, wherein W is the length in the second direction (the X-direction) of the substrate 130A, and $D_{13}$ is the distance in the second direction (the X-direction) from the first conductive part 31V to the third conductive part 33V.

Here, the length W is the distance from one end to the other end of the substrate 130A in the second direction (the X-direction). "The distance in the second direction" between the conductive parts refers not to the center-center distance of the two conductive parts, but to the shortest distance in the second direction (the X-direction) from the outer edge of one conductive part to the outer edge of the other conductive part when viewed along the normal direction of the upper surface 30*a* of the base member 30A (the Z-direction) as schematically shown by the two solid line arrows in FIG. 14. In the specification, "shortest distance" means a distance at the upper surface 30*a* of the base member 30A. By adjusting the arrangement of the first and third conductive parts 31V and 33V in the base member 30A so that the ratio ($D_{13}$/W) is in the range of not less than 0.2 and not more than 0.7, the bias of the residual stress inside the substrate 130A can be more effectively reduced, the warp and the like of the substrate 130A after, for example, the reflow process can be advantageously reduced, and the reliability of the light-emitting device 100A is increased.

The ratio ($D_{24}$/W) of a distance $D_{24}$ to the length W can be in the range of not less than 0.2 and not more than 0.7, wherein $D_{24}$ is the distance in the second direction (the X-direction) from the second conductive part 32V to the fourth conductive part 34V when viewed along the normal direction of the upper surface 30*a* of the base member 30A (the Z-direction). By setting the ratio ($D_{24}$/W) in such a range, similarly to when the ratio ($D_{13}$/W) is in the range of not less than 0.2 and not more than 0.7, the bias of the residual stress inside the substrate 130A can be more effectively reduced, the warp and the like of the substrate 130A after, for example, the reflow process can be advantageously reduced, and the reliability of the light-emitting device 100A is increased.

The ratio ($D_{23}$/W) of a distance $D_{23}$ to the length W can be set in the range of not less than 0.07 and not more than 0.5, wherein $D_{23}$ is the distance between the second conductive part 32V and the third conductive part 33V. Here, the distance $D_{23}$ is the shortest distance between the outer edge of the second conductive part 32V and the outer edge of the third conductive part 33V along a direction connecting the center of the second conductive part 32V and the center of the third conductive part 33V when viewed along the normal direction of the upper surface 30*a* of the base member 30A (the Z-direction). Even when the ratio ($D_{23}$/W) is set in the range of not less than 0.07 and not more than 0.5, the bias of the residual stress inside the substrate 130A can be more effectively reduced, the warp and the like of the substrate 130A after the reflow process can be advantageously reduced, and the reliability of the light-emitting device 100A is increased.

Details of members in the light-emitting device 100A will now be described.

Substrate 130A

The substrate 130A is a support member to which the first light-emitting element 121 and the second light-emitting element 122 are mounted. As described above, the first light-emitting element 121 and the second light-emitting element 122 are arranged on the substrate 130A in one column along the first direction (the Y-direction). According to the embodiment of the disclosure, as described below, elements that have shapes with relatively large aspect ratios of the second direction (the X-direction) to the first direction (the Y-direction) can be used as the first and second light-emitting elements 121 and 122. Accordingly, the substrate 130A as an entirety also can have a relatively long shape in the second direction (the X-direction) (see, e.g., FIG. 11).

The base member 30A of the substrate 130A is a substantially rectangular parallelepiped shape insulating member in which the first wiring part 31T, the second wiring part 32T, the third wiring part 33T, and the fourth wiring part 34T are located at the upper surface 30*a* of the base member 30A. The dimension of the base member 30A in the first direction (here, the transverse direction of the upper surface 30*a*) is, for example, in the range of not less than 400 μm and not more than 800 μm. It is advantageous for the dimension of the base member 30A in the first direction to be not more than 800 μm to downsize the light-emitting device 100A. The dimension of the base member 30A in the second direction (here, the longitudinal direction of the upper surface 30*a*) is, for example, in the range of not less than 1800 μm and not more than 5000 μm. It is beneficial for the dimension of the base member 30A in the second direction to be not more than 5000 μm from the perspective of downsizing the light-emitting device 100A. The dimension of the base member 30A in the Z-direction is, for example, in the range of not less than 200 μm and not more than 1000 μm. It is advantageous for the dimension of the base member 30A in the Z-direction to be not less than 200 μm from the perspective of ensuring the strength of the substrate 130A; and it is beneficial for the dimension of the base member 30A in the Z-direction to be not more than 1000 μm from the perspective of downsizing the light-emitting device 100A.

Examples of the material of the base member 30A include a resin, a ceramic, glass, etc. For example, bismaleimide triazine (BT) is applicable as the material of the base member 30A. The base member 30A can be formed from a composite material such as a fiber-reinforced resin or the like; for example, a glass epoxy substrate is applicable to the base member 30A. Additionally, epoxy, polyimide, etc., can be used as the base material of the base member 30A. Aluminum oxide, aluminum nitride, zirconium oxide, zirconium nitride, titanium oxide, titanium nitride, or a mixture of two or more of these substances are applicable as the ceramic. Among these ceramics, it is advantageous to use a material having a linear expansion coefficient near the linear expansion coefficients of the light-emitting elements 121 and 122 as the material of the base member 30A.

As shown in FIG. 11, in addition to the upper surface 30*a* and the lower surface 30*b*, the base member 30A includes a bottom surface 30*m* positioned between the upper surface 30*a* and the lower surface 30*b*. The bottom surface 30*m* faces the upper surface of the wiring substrate when the light-emitting device 100A is applied to the light source of a backlight.

In the example shown in FIG. 11, the base member 30A includes multiple recesses 30*r* open at the lower surface 30*b* and the bottom surface 30*m*. The number of the recesses 30*r* typically is not less than 2. In the example, a total of four recesses 30*r* are provided in the base member 30A to correspond to the lower surface wiring parts of the substrate 130A including the four wiring parts of the fifth to eighth wiring parts 35R to 38R. In the example shown in FIG. 11, the four recesses 30*r* have a symmetric arrangement in the X-direction with respect to the center of the base member 30A.

Figure 24:
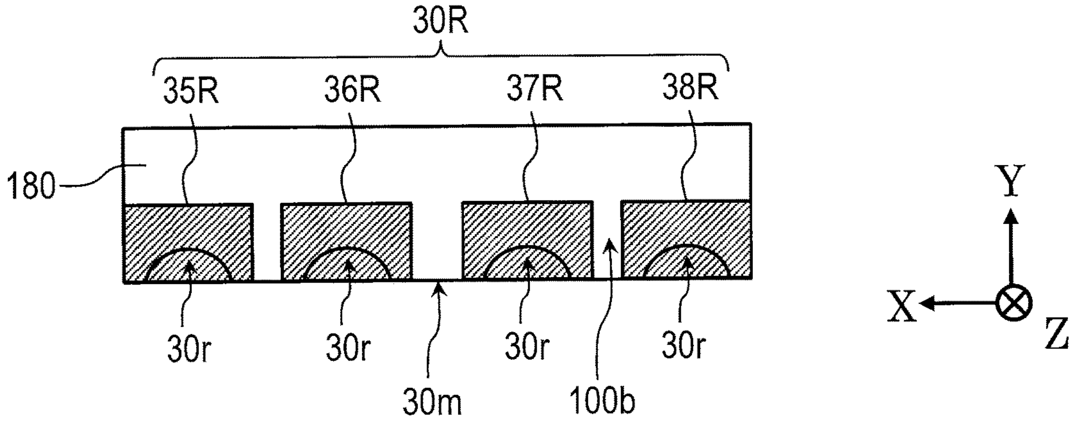
FIG. 24 is a schematic back view showing another example of the substrate of the light-emitting device according to the embodiment.

For example, as understood by referring to FIG. 13, the shapes of the openings of the recesses 30*r* when viewed in back-view along a direction perpendicular to the first direction (the Y-direction) and the second direction (the X-direction) can be semicircular or quadrant-shaped. In the example shown in FIG. 13, among the four recesses 30*r* the shapes of the openings of the two recesses 30*r* positioned at the two X-direction end portions are quadrant-shaped; and the shapes of the openings of the two recesses 30*r* positioned inward in the X-direction are semicircular. As shown in FIG. 24, the shapes of the openings of all of the recesses 30*r* can be semicircular. The recesses 30*r* each are spaces in which a bonding member such as solder or the like is located when the light-emitting device 100A is mounted to a wiring substrate. However, as described below, such recesses 30*r* can be omitted.

In the configuration illustrated in FIG. 11, each of the fifth wiring part 35R, the sixth wiring part 36R, the seventh wiring part 37R, and the eighth wiring part 38R at the lower surface 30*b* side of the base member 30A includes a portion overlapping a corresponding one of the four recesses 30*r*. In other words, each of the fifth wiring part 35R, the sixth wiring part 36R, the seventh wiring part 37R, and the eighth wiring part 38R includes a portion covering the inner surface of the corresponding one of the four recesses 30*r* in addition to the portion appearing at the back surface 100*b* of the substrate 130A. As shown in FIG. 9, for example, the seventh wiring part 37R includes a first portion 37*u* positioned on the lower surface 30*b* of the base member 30A, and a second portion 37*v* covering the inner surface of the one among the recesses 30*r*.

Copper, iron, nickel, tungsten, chrome, aluminum, silver, platinum, gold, titanium, palladium, rhodium, or an alloy including at least one of these metals can be used as the material of the fifth wiring part 35R, the sixth wiring part 36R, the seventh wiring part 37R, and the eighth wiring part 38R at the lower surface 30*b* side of the base member 30A and the material of the first wiring part 31T, the second wiring part 32T, the third wiring part 33T, and the fourth wiring part 34T at the upper surface 30*a* side. It is advantageous to use copper or a copper alloy as the materials of these wiring parts from the perspective of the heat dissipation. The upper surface wiring part and/or the lower surface wiring part can be a single-layer film or a stacked film. It is beneficial for the outermost surface of the upper surface wiring part and/or the lower surface wiring part to be silver, platinum, aluminum, rhodium, gold, or an alloy including at least one of these metals because good wettability with solder is obtained.

The substrate 130A further includes multiple conductive parts located inside the base member 30A. The conductive parts extend from the upper surface 30*a* to the lower surface 30*b* of the base member 30A and electrically connect the upper surface wiring parts (here, the first wiring part 31T, the second wiring part 32T, the third wiring part 33T, and the fourth wiring part 34T) respectively to the lower surface wiring parts. Here, as shown in FIG. 6, the substrate 130A includes four conductive parts, i.e., the first to fourth conductive parts 31V to 34V. The first conductive part 31V connects the first wiring part 31T to the fifth wiring part 35R; and the second conductive part 32V connects the second wiring part 32T to the sixth wiring part 36R. The third conductive part 33V connects the third wiring part 33T to the seventh wiring part 37R; and the fourth conductive part 34V connects the fourth wiring part 34T to the eighth wiring part 38R.

Typically, the first conductive part 31V, the second conductive part 32V, the third conductive part 33V, and the fourth conductive part 34V each extend linearly through the interior of the base member 30A in the third direction (the Z-direction) orthogonal to the first direction (the Y-direction) and the second direction (the X-direction). The shapes of the cross sections of the first to fourth conductive parts 31V to 34V are, for example, circular when cut parallel to the XY-plane. The cross-sectional shapes of the conductive parts are not limited to circular and can be elliptical, polygonal, etc. It is unessential that the shape or size of the cross section of each conductive part be constant along the Z-direction inside the base member 30A. For example, a conductive part shape of which the cross-sectional area increases away from the upper surface 30*a* or toward the upper surface 30*a* also is applicable.

The first to fourth conductive parts 31V to 34V each can be conductive members occupying the entire interior of the through-hole provided in the base member 30A, or can be a combination of an insulating filling member and a conductive film located at the inner surface of the through-hole. For example, materials similar to those of the lower surface wiring part at the lower surface 30*b* side of the base member 30A are applicable to the conductive film covering the inner surface of the through-hole. For example, the region that is surrounded with the conductive film can be filled with an insulating material such as an epoxy resin, etc. In the example shown in FIGS. 7 and 8, each of the first to fourth conductive parts 31V to 34V includes a conductive film 37 covering the inner surface of the through-hole provided in the base member 30A, and an insulating part 39 positioned in the region surrounded with the conductive film 37.

Figure 15:
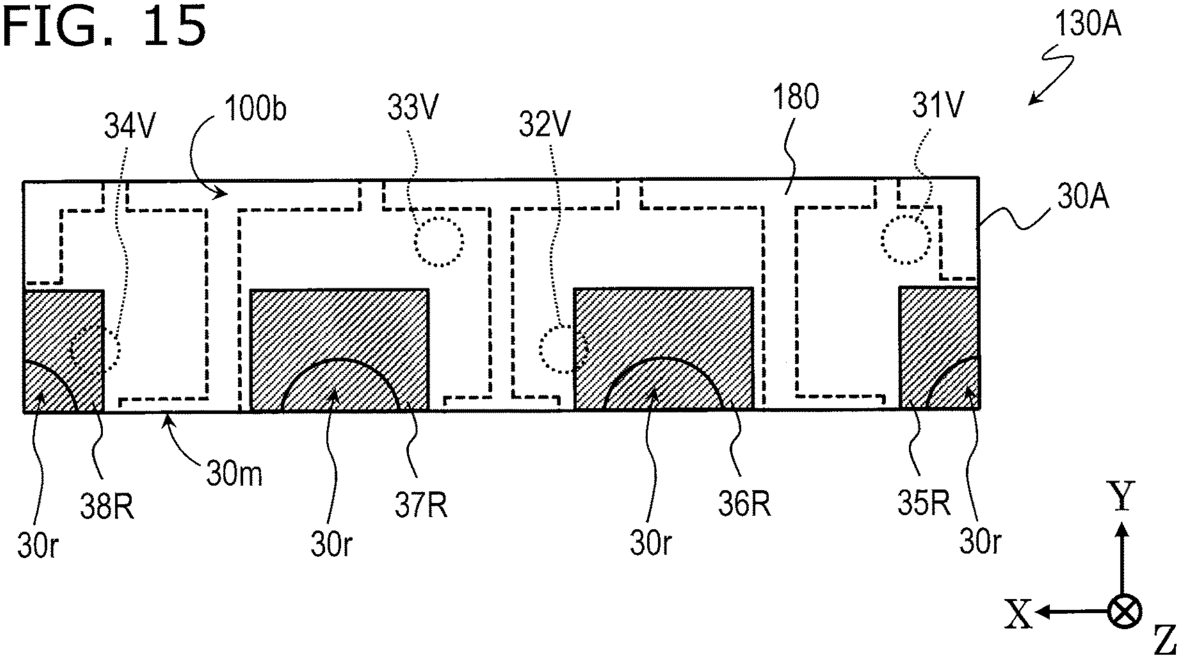
FIG. 15 is a schematic back view of the substrate of the light-emitting device according to the embodiment.

FIG. 15 shows the illustrative appearance when the substrate 130A is viewed from the lower surface 30*b* side of the base member 30A. As schematically shown in FIG. 15, the first to fourth conductive parts 31V to 34V inside the base member 30A can be arranged so that none are positioned to overlap the recesses 30*r* of the base member 30A when viewed in back-view.

As shown in FIG. 15, the substrate 130A can include the insulating layer 180 positioned at the lower surface 30*b* side of the base member 30A. Examples of the material of the insulating layer 180 include a thermosetting resin or a thermoplastic resin. A so-called solder resist can be used as the insulating layer 180. As schematically shown in FIG. 15, the insulating layer 180 has a shape that covers a portion of each of the lower surface wiring parts (here, the fifth wiring part 35R, the sixth wiring part 36R, the seventh wiring part 37R, and the eighth wiring part 38R) on the lower surface 30*b* of the base member 30A. Including such an insulating layer 180 at the back surface 100*b* side of the light-emitting device 100A provides the effect of preventing short-circuits between the lower surface wiring parts via solder when mounting the light-emitting device 100A to a wiring substrate, etc.

First Light-Emitting Element 121 and Second Light-Emitting Element 122

Other than the light emission peak wavelengths, the first light-emitting element 121 and the second light-emitting element 122 can use a substantially common basic structure. Hereinbelow, a description of the common portions of the configurations of the first and second light-emitting elements 121 and 122 can be omitted.

According to the embodiment of the disclosure, the first light-emitting element 121 and the second light-emitting element 122 are mounted by a flip-chip connection on the substrate including the first to fourth wiring parts 31T to 34T. As shown in FIG. 7, the first light-emitting element 121 is electrically connected to the first and third wiring parts 31T and 33T on the base member 30A. As shown in FIG. 8, the second light-emitting element 122 is electrically connected to the second and fourth wiring parts 32T and 34T on the base member 30A.

As shown in FIGS. 7 and 9, the first light-emitting element 121 includes an element upper surface 121*a*, and an element lower surface 121*b* positioned at the side opposite to the element upper surface 121*a*. The first light-emitting element 121 also includes a positive electrode and a negative electrode at the element lower surface 121*b*. As shown in FIGS. 8 and 9, the second light-emitting element 122 includes an element upper surface 122*a*, and an element lower surface 122*b* positioned at the side opposite to the element upper surface 122*a*. The second light-emitting element 122 also includes a positive electrode and a negative electrode at the element lower surface 122*b*. Examples of the materials of the electrodes (positive electrode and the negative electrode) of the first and second light-emitting elements 121 and 122 are gold, silver, tin, platinum, rhodium, titanium, aluminum, tungsten, palladium, nickel, or an alloy including at least one of these metals.

The first light-emitting element 121 is mounted on the substrate 130A by connecting and fixing the electrodes at the element lower surface 121*b* side to the first and third wiring parts 31T and 33T by the bonding member 161 such as solder, etc. The second light-emitting element 122 is mounted on the substrate 130A by connecting and fixing the electrodes at the element lower surface 122*b* side to the second and fourth wiring parts 32T and 34T by the bonding member 162 such as solder, etc. Typically, the first light-emitting element 121 is connected to the first and third wiring parts 31T and 33T so that the electrodes at the element lower surface 121*b* side face the protrusion 31*p* of the first wiring part 31T and the protrusion 33*p* of the third wiring part 33T. The second light-emitting element 122 are connected to the second and fourth wiring parts 32T and 34T so that the electrodes at the element lower surface 122*b* side face the protrusion 32*p* of the second wiring part 32T and the protrusion 34*p* of the fourth wiring part 34T.

The first light-emitting element 121 and the second light-emitting element 122 each include semiconductor structure bodies. The semiconductor structure body includes an n-side semiconductor layer, a p-side semiconductor layer, and an active layer interposed between the n-side semiconductor layer and the p-side semiconductor layer. The active layer can have a single quantum well (SQW) structure, or can have a multi-quantum well (MQW) structure including multiple well layers. The semiconductor structure body includes multiple semiconductor layers made of a nitride semiconductor. The nitride semiconductor includes all compositions of semiconductors of the chemical formula $In_xAl_yGa_{1-x-y}N$ ($0 \leq x$, $0 \leq y$, and $x+y \leq 1$) for which the composition ratios x and y are changed within the ranges respectively. The semiconductor structure bodies of the first and second light-emitting elements 121 and 122 are selected so that a forward voltage Vf of the second light-emitting element 122 is less than a forward voltage Vf of the first light-emitting element 121.

The semiconductor structure body can be positioned on a growth substrate of sapphire, gallium nitride, etc. When the first light-emitting element 121 includes the growth substrate as a portion of the first light-emitting element 121, the upper surface of the growth substrate forms the element upper surface 121*a* of the first light-emitting element 121. When the second light-emitting element 122 includes the growth substrate as a portion of the second light-emitting element 122, the upper surface of the growth substrate forms the element upper surface 122*a* of the second light-emitting element 122. The positive electrode and the negative electrode described above are located at the surface of the semiconductor structure body at the side opposite to the growth substrate and have the function of supplying the prescribed current to the semiconductor structure body. The semiconductor structure body of the first light-emitting element 121 and the semiconductor structure body of the second light-emitting element 122 can be positioned on a single substrate of sapphire, etc.

The semiconductor structure body can include multiple light-emitting parts including an n-side semiconductor layer, an active layer, and a p-side semiconductor layer. When the semiconductor structure body includes multiple light-emitting parts, the light-emitting parts can include well layers having different light emission peak wavelengths, or can include well layers having the same light emission peak wavelength. The light emission peak wavelength being the same also includes cases where there is fluctuation of about several nm. The combination of the light emission peak wavelengths of the multiple light-emitting parts can be selected as appropriate. When the semiconductor structure body of the first light-emitting element 121 includes two light-emitting parts, examples of combinations of the light emitted by the light-emitting parts include a combination of blue light and blue light. When the semiconductor structure body of the second light-emitting element 122 includes two light-emitting parts, examples of combinations of the light emitted by the light-emitting parts include a combination of green light and green light. As long as the light emission peak wavelength of the first light-emitting element 121 is 430 nm or greater and less than 490 nm and the light emission peak wavelength of the second light-emitting element 122 is 490 nm or greater and less than 570 nm, the light-emitting parts can include one or more well layers having different light emission peak wavelengths from the other well layers.

According to the embodiment of the disclosure, the shapes of the first and second light-emitting elements 121 and 122 are relatively long in the second direction (the X-direction) compared to the first direction (the Y-direction). The length along the first direction (the Y-direction) of the element upper surface 121*a* of the first light-emitting element 121 can be, for example, in the range of not less than 150 μm and not more than 300 μm; and the length along the second direction (the X-direction) can be, for example, in the range of not less than 400 μm and not more than 1500 μm. The ratio of the length along the second direction (the X-direction) to the length along the first direction (the Y-direction) of the element upper surface 121*a* of the first light-emitting element 121 is, for example, in the range of not less than 1.1 and not more than 10. The dimensions of the element upper surface 122*a* of the second light-emitting element 122 are similar. Because the first light-emitting element 121 and the second light-emitting element 122 that are relatively long in the second direction (the X-direction) are arranged in the first direction (the Y-direction) (i.e., arranged in one column in the first direction), a high light extraction efficiency can be realized while reducing the number of light-emitting elements in the second direction (the X-direction). The warp reduction of the substrate 130A also is advantageous for mounting such elongated elements to the substrate 130A.

The first light-emitting element 121 includes two element side surfaces 121*c* parallel to the first direction (the Y-direction) and two element side surfaces 121*c* parallel to the second direction (the X-direction). The element side surfaces 121*c* connect the element upper surface 121*a* and the element lower surface 121*b* in the third direction (the Z-direction). The second light-emitting element 122 includes two element side surfaces 122*c* parallel to the first direction (the Y-direction) and two element side surfaces 122*c* parallel to the second direction (the X-direction). The element side surfaces 122*c* connect the element upper surface 122*a* and the element lower surface 122*b* in the third direction (the Z-direction).

Light-Transmitting Member 150

The light-transmitting member 150 is a plate-like member having the function of protecting the first light-emitting element 121 and the second light-emitting element 122. As shown in FIG. 4, the upper surface of the light-transmitting member 150 forms the light extraction surface 50*a* of the light-emitting device 100A. The light-transmitting member 150 is light-transmissive and includes, for example, a base material of silicone resin or the like.

For example, the light-transmitting member 150 has a transmittance of not less than 60% for light having the light emission peak wavelength of the first light-emitting element 121. The light-transmitting member 150 also can have a transmittance of not less than 60% for light having the light emission peak wavelength of the second light-emitting element 122. From the perspective of effectively utilizing the light, it is beneficial for the transmittance of the light-transmitting member 150 for the light emission peak wavelength of at least one of the first light-emitting element 121 or the second light-emitting element 122 to be not less than 70%, and more beneficially not less than 80%.

According to the embodiment as shown in FIG. 9, the light-transmitting member 150 is located above the first light-emitting element 121 and above the second light-emitting element 122 to collectively cover the entire element upper surface 121*a* of the first light-emitting element 121 and the entire element upper surface 122*a* of the second light-emitting element 122. Because a single light-transmitting member 150 covers both the first and second light-emitting elements 121 and 122, the light from the first light-emitting element 121 and the light from the second light-emitting element 122 can be efficiently mixed inside the light-transmitting member 150.

Examples of the base material of the light-transmitting member 150 include a silicone resin, a modified silicone resin, an epoxy resin, a modified epoxy resin, a urea resin, a phenol resin, a polycarbonate resin, a trimethylpentene resin, a polynorbornene resin, an acrylic resin, a urethane resin, a fluorocarbon resin, or a resin including two or more of these resins. Glass can be selected as the base material of a wavelength conversion layer 152. The base material of the light-transmitting member 150 can include a wavelength conversion member such as a phosphor, etc.

In the configuration illustrated in FIG. 9, the light-transmitting member 150 includes a protective layer 151 and the wavelength conversion layer 152. The protective layer 151 is positioned more distant from the substrate 130A than the wavelength conversion layer 152. That is, in the example, the wavelength conversion layer 152 is positioned between the protective layer 151 and the set of the first and second light-emitting elements 121 and 122.

The wavelength conversion layer 152 is a plate-like member that includes a wavelength conversion member and performs wavelength conversion of a portion of incident light to emit, for example, light of a different wavelength. A known phosphor can be used as the wavelength conversion member included in the base material of the wavelength conversion layer 152. An yttrium-aluminum-garnet-based phosphor (e.g., $Y_3(Al, Ga)_5O_{12}$:Ce), a lutetium-aluminum-garnet-based phosphor (e.g., $Lu_3(Al, Ga)_5O_{12}$:Ce), a terbium-aluminum-garnet-based phosphor (e.g., $Tb_3(Al, Ga)_5O_{12}$:Ce), a CCA-based phosphor (e.g., $Ca_{10}(PO_4)_6Cl_2$:Eu), an SAE-based phosphor (e.g., $Sr_4Al_{14}O_{25}$:Eu), a chlorosilicate-based phosphor (e.g., $Ca_8MgSi_4O_{16}Cl_2$:Eu), an oxynitride-based phosphor, a nitride-based phosphor, a fluoride-based phosphor, a phosphor having a perovskite structure (e.g., $CsPb(F, Cl, Br, I)_3$), a quantum dot phosphor (e.g., CdSe, InP, $AgInS_2$, or $AgInSe_2$), etc., can be used as the phosphor. Typical examples of the oxynitride-based phosphor include a β-sialon-based phosphor (e.g., $(Si, Al)_3(O, N)_4$:Eu), an α-sialon-based phosphor (e.g., $Ca(Si, Al)_{12}(O, N)_{16}$:Eu), etc. Typical examples of the nitride-based phosphor include an SLA-based phosphor (e.g., $SrLiAl_3N_4$:Eu), a CASN-based phosphor (e.g., $CaAlSiN_3$:Eu), a SCASN-based phosphor (e.g., $(Sr, Ca)AlSiN_3$:Eu), etc. Typical examples of the fluoride-based phosphor include a KSF-based phosphor (e.g., $K_2SiF_6$:Mn), a KSAF-based phosphor (e.g., $K_2Si_{0.99}Al_{0.01}F_{5.99}$:Mn), a MGF-based phosphor (e.g., $3.5MgO \cdot 0.5MgF_2 \cdot GeO_2$:Mn), etc.

In particular, a fluoride-based phosphor such as a KSF-based phosphor (e.g., $K_2SiF_6$:Mn), a KSAF-based phosphor (e.g., $K_2Si_{0.99}Al_{0.01}F_{5.99}$:Mn), a MGF-based phosphor (e.g., $3.5MgO \cdot_{0.5}MgF_2 \cdot GeO_2$:Mn), or the like, a phosphor having a perovskite structure (e.g., $CsPb(F, Cl, Br, I)_3$), a quantum dot phosphor (e.g., CdSe, InP, $AgInS_2$, or $AgInSe_2$), etc., can be used as the phosphor in the wavelength conversion layer 152. By selecting such a light-emitting element and phosphor, the wavelength conversion layer 152 absorbs a portion of the light from the light-emitting element and emits light in the red wavelength region, which can provide white light by mixing with the blue light and the green light transmitted by the wavelength conversion layer 152. When a wavelength conversion layer including a phosphor emitting red light due to excitation is located above an LED emitting blue light and an LED emitting green light, a configuration in which the wavelength conversion layer selectively covers the LED emitting blue light, that is, a configuration in which the wavelength conversion layer does not cover the LED emitting green light, also is applicable. However, from the perspective of obtaining white light with less uneven color, it is favorable for the wavelength conversion layer 152 to be arranged to cover both the LED emitting blue light and the LED emitting green light.

The wavelength conversion layer 152 can include one of the phosphors described above alone, or can include a combination of two or more of such phosphors. When the wavelength conversion layer 152 includes two or more phosphors, it is beneficial to adjust the distribution of the wavelength conversion members inside the wavelength conversion layer 152 so that phosphors emitting light of shorter wavelengths are positioned more proximate to the light-emitting element. Or, the wavelength conversion layer can include two layers; and mutually-different types of phosphors can be included respectively in the layers. In such a case, it is beneficial for the layer proximate to the light-emitting element to include the phosphor in which the light emitted by excitation has a shorter wavelength.

The wavelength conversion layer 152 can be provided with the function of light diffusion by dispersing a material having a different refractive index from the base material in the material of the wavelength conversion layer 152. For example, the wavelength conversion layer 152 can include the light-diffusing material described below.

The protective layer 151 is a light-transmitting layer of the light-transmitting member 150 positioned at the outermost surface at the side opposite to the first and second light-emitting elements 121 and 122. The upper surface of the protective layer 151 forms the light extraction surface 50*a* of the light-transmitting member 150; and in the example shown in FIG. 9, the upper surface of the protective layer 151 is aligned with the front surface 100*a* of the light-emitting device 100A.

The base material of the protective layer 151 can include a material similar to the base material of the wavelength conversion layer 152 such as a silicone resin, an epoxy resin, etc. From the perspective of efficiently introducing the light to the protective layer 151, it is beneficial for the material of the protective layer 151 to have a higher refractive index than the material of the wavelength conversion layer 152. The protective layer 151 can be provided with a light-diffusing function by dispersing, in the base material, a light-diffusing material having a different refractive index from the base material.

Light-Diffusing Member 154

In the configuration illustrated in FIG. 9, the light-emitting device 100A further includes a light-diffusing member 154. The light-diffusing member 154 is a plate-like member located between the light-transmitting member 150 and the element upper surface 121*a* of the first light-emitting element 121 and between the light-transmitting member 150 and the element upper surface 122*a* of the second light-emitting element 122.

The light-diffusing member 154 includes a light-transmitting base material, and a light-diffusing material dispersed in the base material. Similarly to the protective layer 151, the base material of the light-diffusing member 154 can include a material similar to the base material of the wavelength conversion layer 152. For example, particles of a resin having a different refractive index from the base material, particles of silicon oxide, aluminum oxide, zirconium oxide, or zinc oxide, etc., can be used as the light-diffusing material. A nanoparticle that has a particle size defined by $D_{50}$ of not less than 1 nm and not more than 100 nm can be used as a light-diffusing material dispersed in a base material. The light scattering inside the light-diffusing member 154 can be increased by using nanoparticles as the light-diffusing material.

As illustrated in FIG. 9, the light-diffusing member 154 can be interposed between the wavelength conversion layer 152 and the set of the first and second light-emitting elements 121 and 122.

Light Guide Member 170

In the configuration illustrated in FIGS. 7 to 9, the light-emitting device 100A further includes a light guide member 170. In the example, the light-diffusing member 154 is located above the element upper surface 121*a* of the first light-emitting element 121 and the element upper surface 122*a* of the second light-emitting element 122 by means of the light guide member 170. The light guide member 170 includes at least a portion positioned on the element side surface 121*c* of the first light-emitting element 121 and a portion positioned on the element side surface 122*c* of the second light-emitting element 122.

A resin material that includes a transparent resin as a base material can be used as the material of the light guide member 170. For example, the base material of the light guide member 170 can include a material similar to the base material of the light-transmitting member 150. The light guide member 170 can be provided with a light-diffusing function by dispersing a light-diffusing material having a different refractive index from the base material. The refractive index of the light guide member 170 can be set to be greater than the refractive index of the light-transmitting member 150 and less than the refractive indexes of the first and second light-emitting elements 121 and 122. For example, the light guide member 170 can be formed of a material having a refractive index of not less than 1.52 and not more than 1.60. By satisfying such a refractive index relationship, the efficiency of emitting the light outside the light-emitting device 100A from the first and second light-emitting elements 121 and 122 can be increased because the refractive index gradually decreases from the first and second light-emitting elements 121 and 122 toward the light-transmitting member 150.

The light guide member 170 includes a portion positioned between the light-reflective member 140 and the element side surface 121*c* of the first light-emitting element 121. By including the light guide member 170, a portion of the light emitted by the first light-emitting element 121 through the element side surface 121*c* can be incident on the light-diffusing member 154 (or the light-transmitting member 150) by utilizing a reflection at the interface between the light guide member 170 and the light-reflective member 140. In other words, the light that is incident on the light guide member 170 is emitted outside the light-emitting device 100A via the light-diffusing member 154 and the light-transmitting member 150 by being reflected toward the light-diffusing member 154 at the position of an outer surface 170*c* of the light guide member 170. This is similar for a portion of the light emitted by the second light-emitting element 122 through a side surface 122*c*. By including the light guide member 170, the light extraction efficiency of the light-emitting device 100A can be increased.

Figure 25:
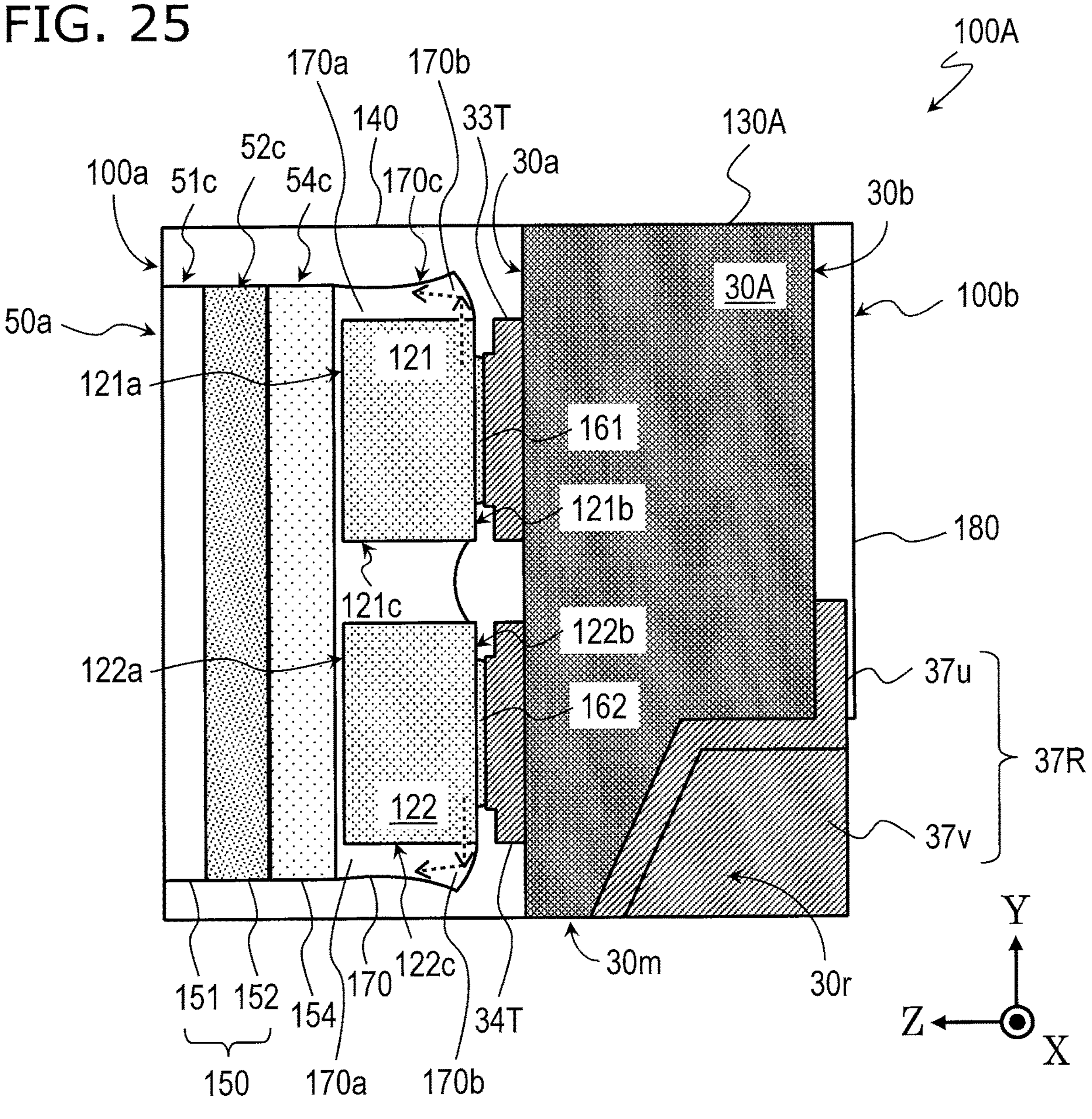
FIG. 25 is a schematic cross-sectional view showing a modification of the light guide member shown in FIG. 9.

For example, the light guide member 170 is formed by curing a liquid resin. Because the size in the first direction (the Y-direction) is less than the size in the second direction (the X-direction) in the light-emitting device 100A, the light guide member 170 tends to bulge more in the short-side direction than in the long-side direction (the X-direction) of the light-emitting element when formed. As a result, as shown in FIG. 25, for the light guide member 170 located at the element side surfaces 121*c* and 122*c* of the light-emitting elements 121 and 122 parallel to the second direction (the X-direction), the thickness in the first direction (the Y-direction) of a lower part 170*b* positioned at the element lower surface 121*b* side and the element lower surface 122*b* side can be set to be greater than the thickness in the first direction (the Y-direction) of an upper part 170*a* positioned at the element upper surface 121*a* side and the element upper surface 122*a* side. As shown by the broken-line arrows in FIG. 34, such a structure can increase the light extraction efficiency from the light extraction surface 50*a* of the light-emitting device 100A by easily reflecting the light emitted from the element side surfaces 121*c* and 122*c* of the light-emitting elements 121 and 122 upward at the interface between the light-reflective member 140 and the lower part 170*b* of the light guide member 170.

Light-Reflective Member 140

The light-reflective member 140 surrounds the light-transmitting member 150 and the set of the first and second light-emitting elements 121 and 122 on the substrate 130A. In the specification, "light-reflective" refers to the reflectance for the light emission peak wavelength of the light-emitting element (the first light-emitting element 121 or the second light-emitting element 122) being not less than 60%. It is more beneficial for the reflectance for the light emission peak wavelength of the light-emitting element of the light-reflective member 140 to be not less than 70%, and more beneficially not less than 80%.

Examples of the material of the light-reflective member 140 include, for example, a resin material in which a light-diffusing material is dispersed. For example, a silicone resin, a modified silicone resin, an epoxy resin, a urea resin, a polycarbonate resin, a phenol resin, an acrylic resin, a urethane resin, a fluorocarbon resin, a modified resin of these resins, or a resin including two or more of these resins can be used as the base material of the light-reflective member 140. A particle of an inorganic material or organic material having a higher refractive index than the base material can be used as the light-diffusing material. Examples of the light-diffusing material include a particle of titanium oxide, magnesium oxide, zirconium dioxide, potassium titanate, aluminum oxide, aluminum nitride, boron nitride, mullite, niobium oxide, barium sulfate, silicon oxide, various rare-earth oxides (e.g., yttrium oxide or gadolinium oxide), etc. The light-reflective member 140 can be white.

As shown in FIGS. 7 to 9, the light-reflective member 140 covers the structure on the upper surface 30*a* of the base member 30A other than the light extraction surface 50*a* of the light-transmitting member 150. In the configuration illustrated in FIGS. 7 to 9, the light-reflective member 140 contacts a side surface 51*c* of the protective layer 151, a side surface 52*c* of the wavelength conversion layer 152, and a side surface 54*c* of the light-diffusing member 154. At least a portion of the light-reflective member 140 faces the element side surface 121*c* of the first light-emitting element 121 and the element side surface 122*c* of the second light-emitting element 122. In other words, at least a portion of the light-reflective member 140 can contact the element side surface 121*c* of the first light-emitting element 121 and the element side surface 122*c* of the second light-emitting element 122.

A portion of the light-reflective member 140 may be positioned between the first light-emitting element 121 and the substrate 130A and between the second light-emitting element 122 and the substrate 130A. By providing the light-reflective member 140 at the element lower surface 121*b* side of the first light-emitting element 121 and the element lower surface 122*b* side of the second light-emitting element 122, the emission of light from the element lower surface sides of the light-emitting elements can be reduced, and an effect of improving the utilization efficiency of the light is obtained.

Figure 16:
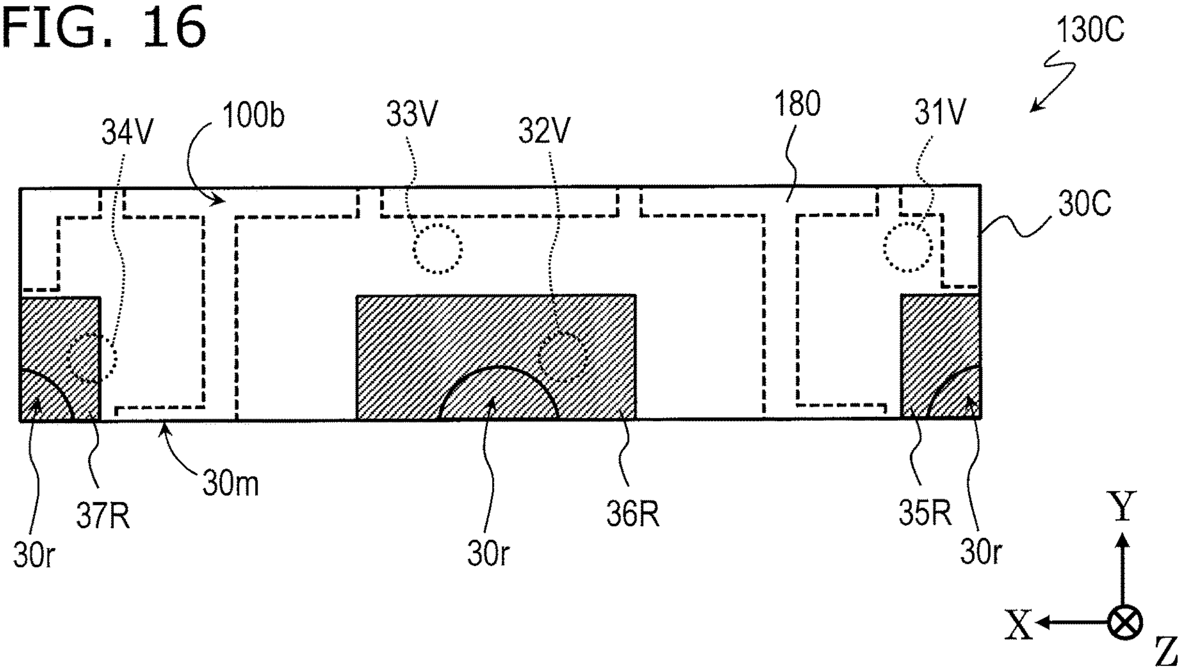
FIG. 16 is a schematic back view showing another example of the substrate of the light-emitting device according to the embodiment.

FIG. 16 shows another example of a substrate supporting the first light-emitting element 121 and the second light-emitting element 122. The substrate 130C shown in FIG. 16 includes a base member 30C in which three recesses 30*r* open at the back surface 100*b* side of the light-emitting device are provided. As shown in FIG. 16, the number of the recesses 30*r* provided in the base member 30C can be, for example, three. In such a case, the fifth wiring part 35R, the sixth wiring part 36R, and the seventh wiring part 37R can include portions respectively covering inner sides of the corresponding recesses among the three recesses 30*r*. According to the embodiment of the disclosure, it is unessential that the number of the recesses 30*r* matches the number of lower surface wiring parts. The recesses 30*r* are unessential to the base member 30C; and the recesses 30*r* can be omitted. The sixth wiring part 36R is connected with the two conductive parts of the second and third conductive parts 32V and 33V; and a current flows in both the first and second states described above. On the other hand, the area of the wiring part can be greater than when separate wiring parts are provided respectively for the second and third conductive parts 32V and 33V. By increasing the area of the wiring part, the heat due to the light emission of the light-emitting elements can be efficiently dissipated.

Figure 17:
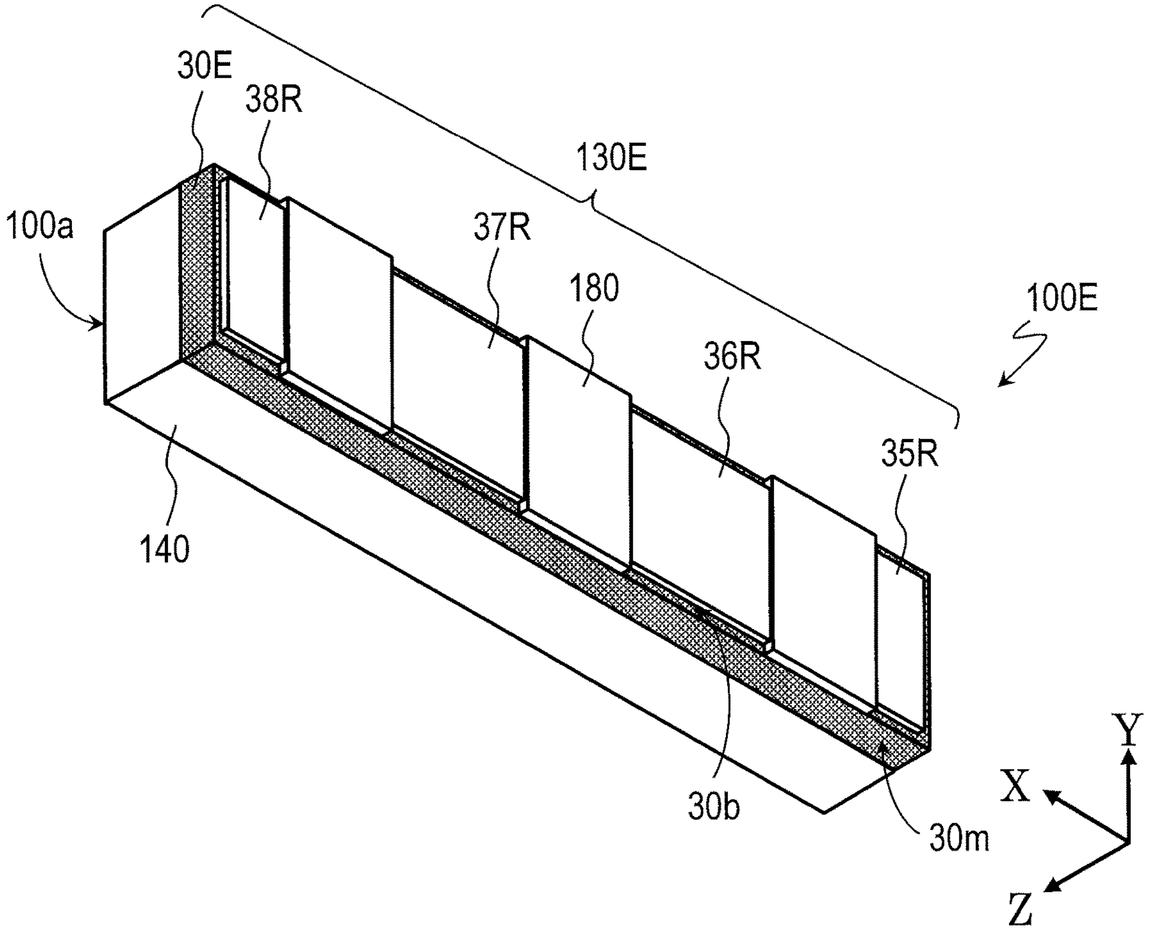
FIG. 17 is a schematic perspective view showing another modification of the light-emitting device according to the embodiment.

FIG. 17 shows another modification of the light-emitting device according to the embodiment of the disclosure. Compared with the light-emitting device 100A described with reference to FIGS. 4 to 9, a light-emitting device 100E shown in FIG. 17 includes a substrate 130E instead of the substrate 130A. The substrate 130E includes the fifth wiring part 35R, the sixth wiring part 36R, the seventh wiring part 37R, the eighth wiring part 38R, and a base member 30E supporting these lower surface wiring parts. Unlike the base members 30A to 30D described above, recesses 30*r* that are open at the lower surface 30*b* and the bottom surface 30*m* are not provided in the base member 30E.

As in the configuration illustrated in FIG. 17, recesses may not be provided in the substrate 130E of the light-emitting device 100E. In the example shown in FIG. 17, recesses are not provided in the base member 30E of the substrate 130E supporting the light-emitting elements; accordingly, the fifth wiring part 35R, the sixth wiring part 36R, the seventh wiring part 37R, and the eighth wiring part 38R each have flat plate shapes. In other words, in the example, the fifth wiring part 35R, the sixth wiring part 36R, the seventh wiring part 37R, and the eighth wiring part 38R do not include portions covering inner sides of recesses.

The light-emitting device 100E can be used as a so-called top-view light-emitting device. In other words, when mounting to a support substrate including wiring parts at the surface, etc., the light-emitting device 100E can be arranged on the support substrate so that the fifth wiring part 35R, the sixth wiring part 36R, the seventh wiring part 37R, and the eighth wiring part 38R face the support substrate. Even a top surface-emitting light-emitting device can be used as a light source for a backlight in which light enters through the side surface of a light guide plate if the side surface of the light guide plate and the surface of the support substrate are arranged to be parallel. Because the light source according to the embodiment includes the drive circuit, the switch, and the timing controller in addition to the light-emitting device, there are cases where the space in which the light source is located relative to the light guide plate is limited. In such a case, either a side-emitting light-emitting device or a top surface-emitting light-emitting device can be appropriately selected by considering the space in which the light source is located.

Light Source 200 According to Other Embodiment

Figure 18:
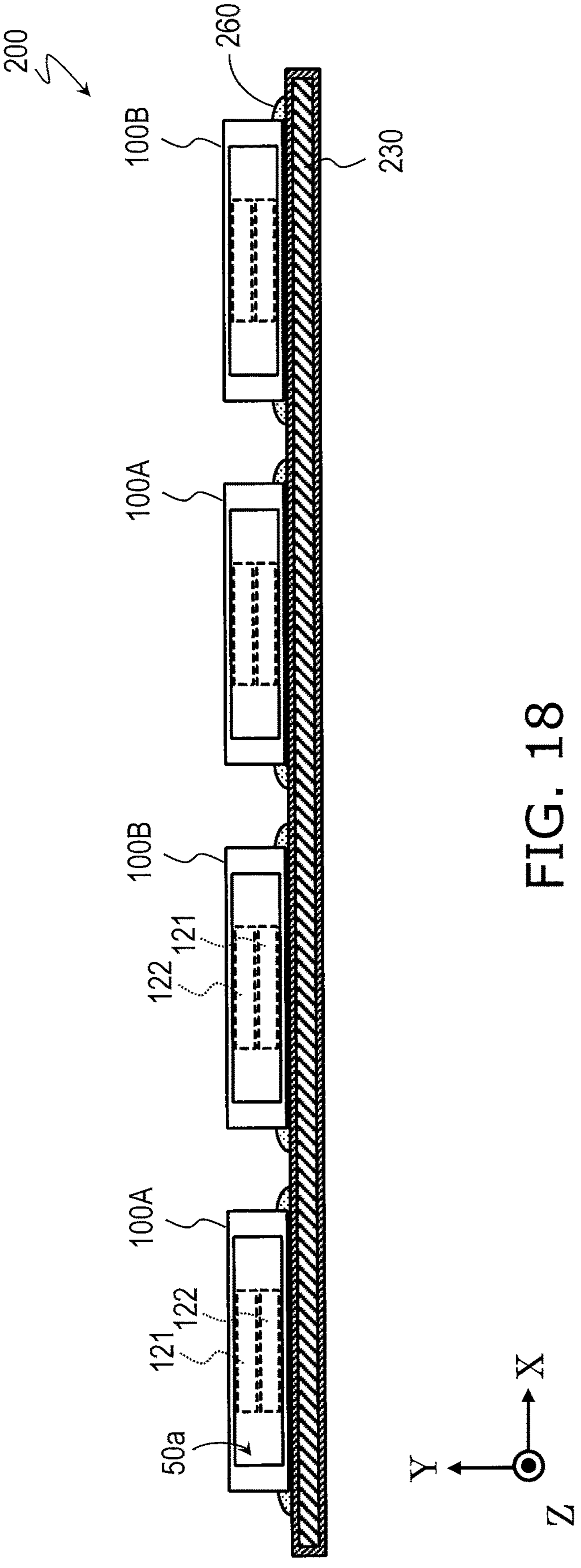
FIG. 18 is a schematic front view of a light source according to another embodiment.

FIG. 18 shows a light source 200 according to another embodiment of the disclosure. The light source 200 is a linear light source having a configuration in which the multiple light-emitting devices 100A and 100B are arranged along the second direction (the X-direction) on a support substrate 230.

The light source 200 includes the support substrate 230 that includes wiring parts, and the multiple light-emitting devices 100A and 100B that are located on the support substrate 230 and electrically connected to the wiring parts of the support substrate 230. In the example shown in FIG. 18, the light source 200 includes four light-emitting devices including two light-emitting devices 100A and two light-emitting devices 100B. The number of light-emitting devices on the support substrate 230 is not limited to four and can be any number.

In the light source 200, the light-emitting device 100A and the light-emitting device 100B are used as side-emitting light-emitting devices. The light extraction surfaces 50*a* of the light-emitting devices 100A and 100B face a lateral direction parallel to the mounting surface instead of upward from the mounting surface. The light-emitting device 100A and the light-emitting device 100B are alternately arranged on the support substrate 230 along the X-direction so that the light extraction surfaces 50*a* of the light-emitting devices 100A and 100B face the same direction. In the light source 200, the normal of the light extraction surface 50*a* of the light-emitting device 100A and the normal of the light extraction surface 50*a* of the light-emitting device 100B each are parallel to the Z-direction.

The light-emitting device 100A and the light-emitting device 100B are bonded to wiring parts on the support substrate 230 by bonding members 260 such as solder, etc. At least portions of the bonding members 260 can be positioned inside the recesses 30*r* (described above) provided in the base members of the light-emitting devices 100A and 100B.

Figure 19:
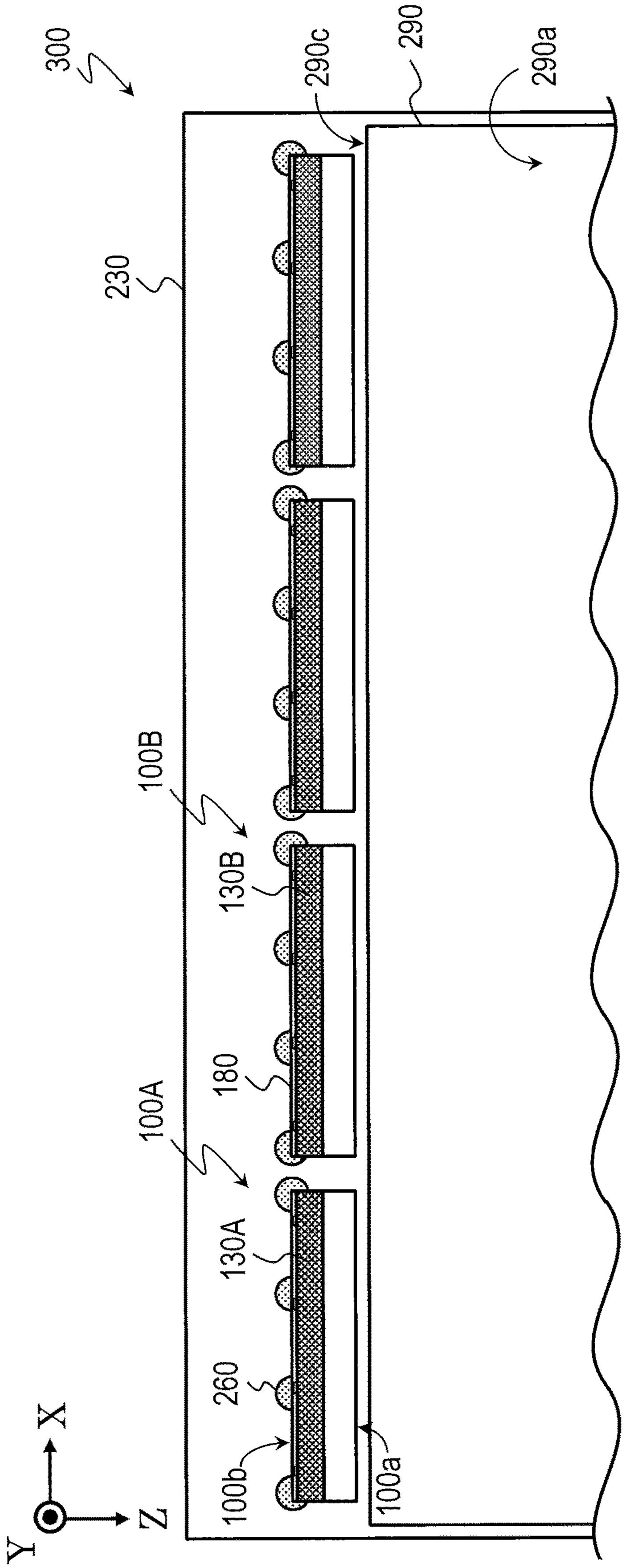
FIG. 19 is a schematic plan view of a backlight unit including the light source shown in FIG. 18.

FIG. 19 shows an example of a backlight unit including the light source 200 shown in FIG. 18. The backlight unit 300 shown in FIG. 19 includes a light guide plate 290 of which a side surface 290*c* faces the light-emitting devices 100A and 100B of the light source 200. The light that is emitted from the light-emitting devices 100A and 100B of the light source 200 and introduced to the light guide plate 290 through the side surface 290*c* of the light guide plate 290 is extracted outside the light guide plate 290 through an upper surface 290*a* of the light guide plate 290.

Other than the arrangement of the first and second light-emitting elements 121 and 122, the basic configuration of the light-emitting device 100B of the light source 200 is substantially the same as the light-emitting device 100A. Among the four light-emitting devices shown in FIG. 18, FIG. 20 schematically shows a set of the light-emitting devices 100A and 100B that are adjacent to each other in the X-direction.

In the light-emitting devices 100A and 100B, one of the first light-emitting element 121 or the second light-emitting element 122 is positioned between the support substrate 230 and the other of the first light-emitting element 121 or the second light-emitting element 122 in the first direction (the Y-direction). In other words, the first light-emitting element 121 and the second light-emitting element 122 are positioned to overlap at the same position when the light-emitting devices 100A and 100B are viewed from the +Y direction.

Figure 20:
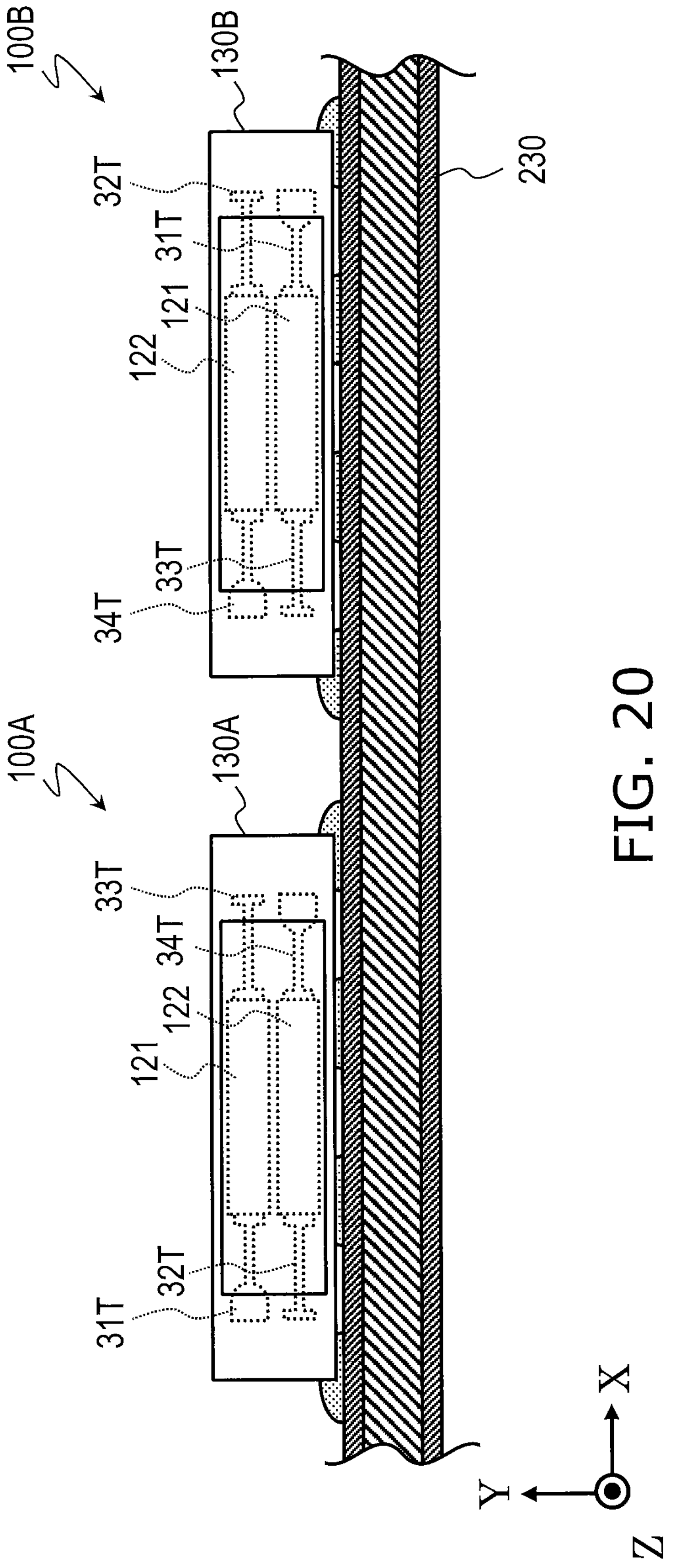
FIG. 20 is a front view schematically showing two mutually-adjacent light-emitting devices removed from the four light-emitting devices shown in FIG. 18.

In the light-emitting devices 100A and 100B shown in FIGS. 18 to 20, when the first light-emitting element 121 and the second light-emitting element 122 are separated and do not overlap when the light-emitting devices 100A and 100B are viewed from the +Y direction, the flashing of the blue light and the green light accompanying the switching of the switch 240 described above is easily perceived as flicker noise. In contrast, when the first light-emitting element 121 and the second light-emitting element 122 are positioned to overlap at the same position when the light-emitting devices 100A and 100B are viewed from the +Y direction as in the embodiment, the same position constantly continues to emit light; therefore, the flashing of the blue light and the green light accompanying the switching of the switch 240 is not easily perceived as flicker noise.

In the light-emitting device 100A as shown in FIG. 20, the second and fourth wiring parts 32T and 34T of the substrate 130A are positioned more proximate to the support substrate 230 than the first and third wiring parts 31T and 33T. In the first direction (the Y-direction), the second light-emitting element 122 that is included in the light-emitting device 100A is positioned between the support substrate 230 and the first light-emitting element 121 included in the light-emitting device 100A. In the light-emitting device 100A, the second light-emitting element 122 is positioned more proximate to the support substrate 230 than the first light-emitting element 121.

The light-emitting device 100B includes a substrate 130B instead of the substrate 130A. The first and third wiring parts 31T and 33T of the substrate 130B are positioned more proximate to the support substrate 230 than the second and fourth wiring parts 32T and 34T. Conversely to the light-emitting device 100A, in the first direction (the Y-direction), the first light-emitting element 121 included in the light-emitting device 100B is positioned between the support substrate 230 and the second light-emitting element 122 included in the light-emitting device 100B. In the light-emitting device 100B, the first light-emitting element 121 is positioned more proximate to the support substrate 230 than the second light-emitting element 122.

In the light source 200 as shown in FIG. 18, the first light-emitting element 121 that is a blue LED element and the second light-emitting element 122 that is a green LED element are arranged in a zigzag configuration along the X-direction on the support substrate 230.

In a light-emitting device configured to emit white light via a wavelength conversion layer, high luminance can be realized by arranging, in the transverse direction of the light-emitting device (the Y-direction), the first light-emitting element 121 and the second light-emitting element 122 that have mutually-different light emission peak wavelengths.

Furthermore, in the example shown in FIG. 18, the arrangement of the first and second light-emitting elements 121 and 122 with respect to the transverse direction of the light-emitting devices 100A and 100B is reversed between the two light-emitting devices 100A and 100B adjacent to each other along the longitudinal direction of the light-emitting device (the X-direction). Thus, white light with less uneven color can be realized while obtaining high luminance by arranging the light-emitting devices 100A and 100B in one column in the Y-direction on the support substrate 230 so that the first light-emitting element 121 and the second light-emitting element 122 are arranged alternately along the X-direction between the multiple light-emitting devices 100A and 100B.

The light-emitting devices that are mounted on the support substrate 230 are not limited to the light-emitting devices 100A and 100B. For example, a linear light source can be realized by mounting a plurality of the light-emitting device 100E shown in FIG. 17 on one support substrate 230 along the second direction (the X-direction) so that the light extraction surfaces 50*a* face the same direction. In such a case as well, the multiple light-emitting devices 100E can be mounted on the support substrate 230 so that the first and second light-emitting elements 121 and 122 are positioned alternately in the first direction (the Y-direction) between the adjacent light-emitting devices 100E.

Method for Driving Light Source 200

Figure 22:
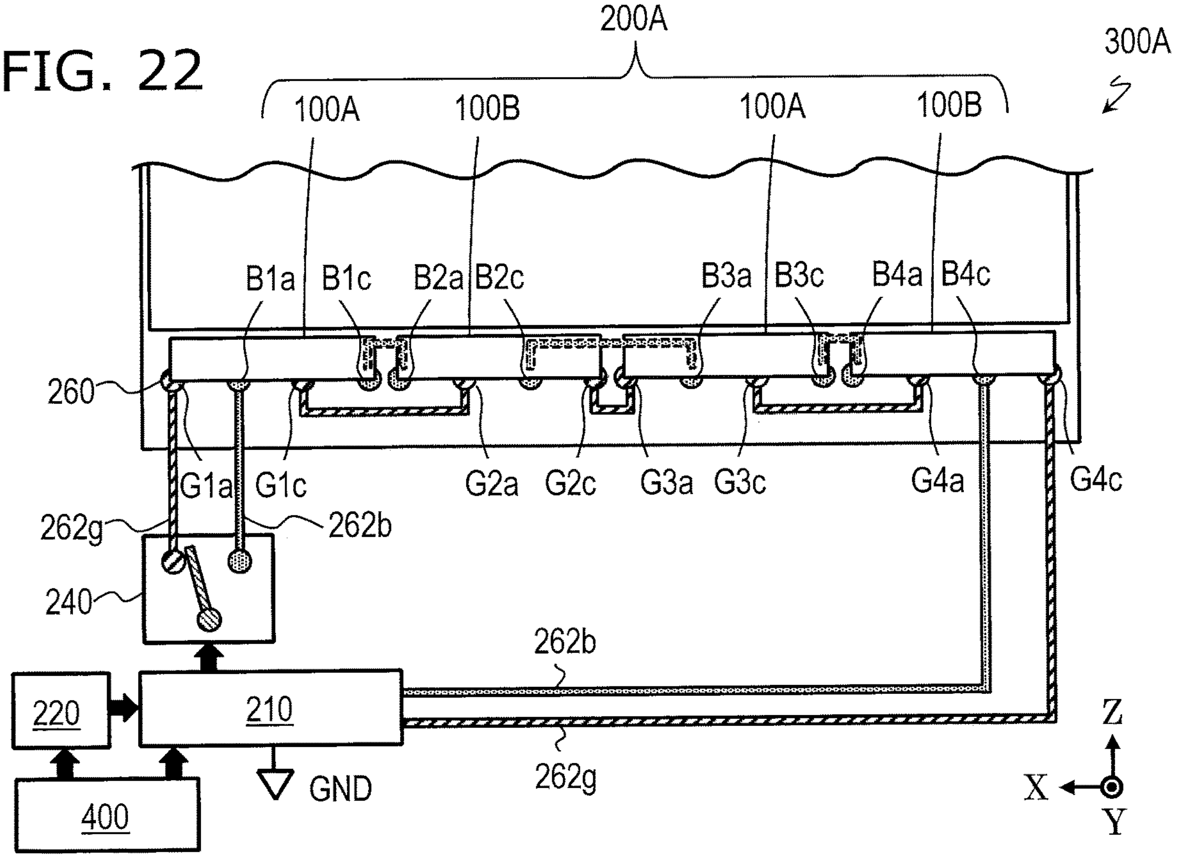
FIGS. 22 and 23 are schematic views showing configurations of light sources according to other embodiments.
Figure 23:
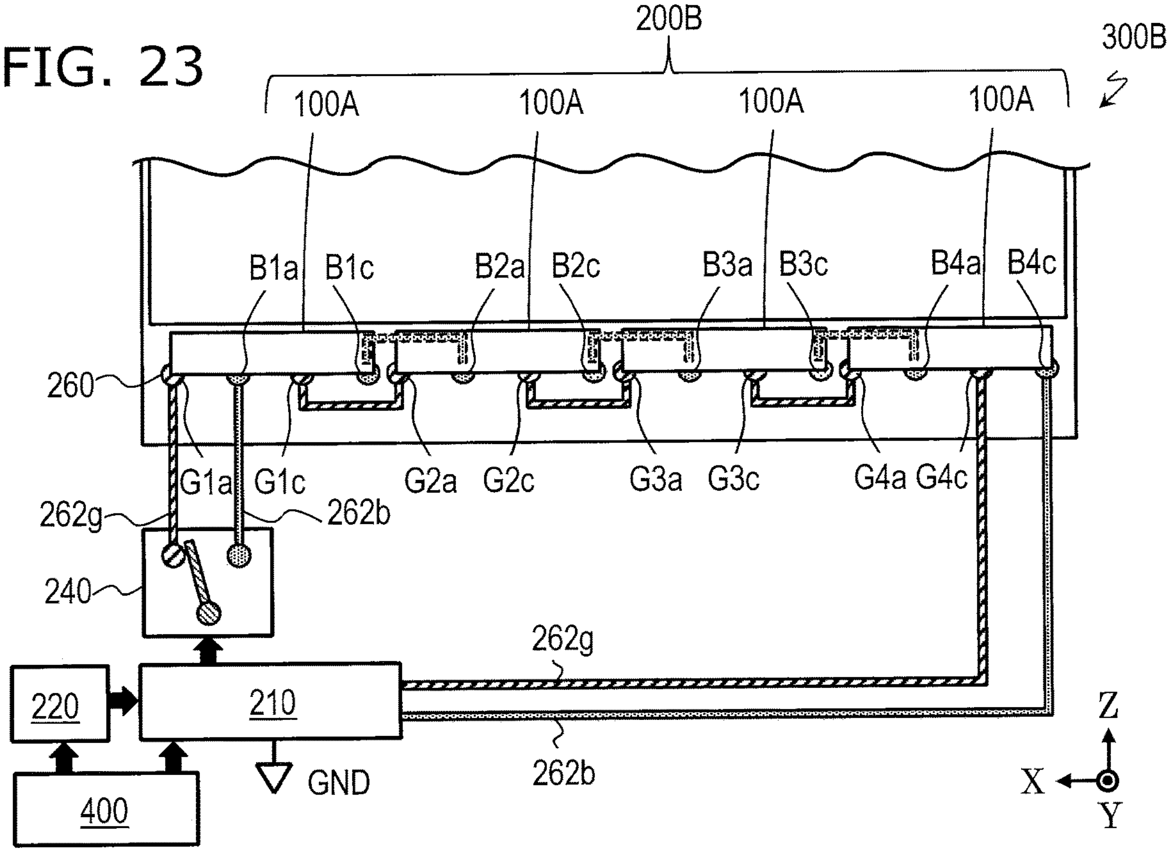

A driving method of the light source (the linear light source) 200 described above will now be described with reference to FIGS. 21 to 23.

Figure 21:
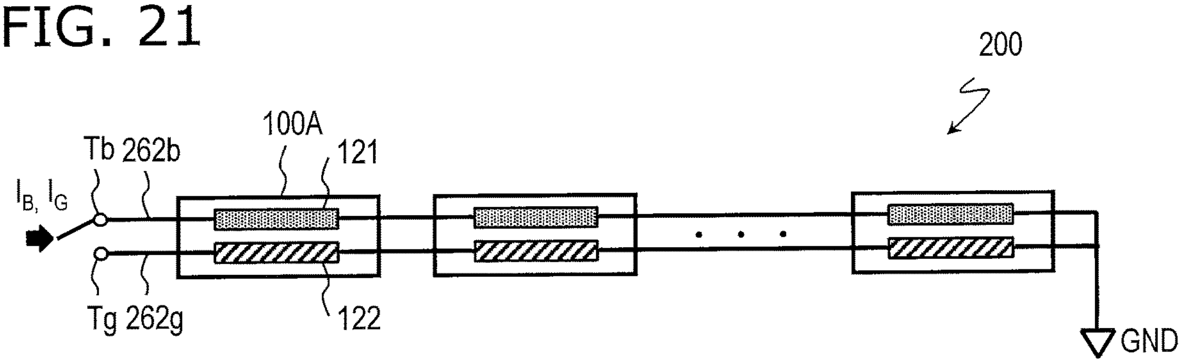
FIG. 21 is a schematic view for describing a driving method of the light source according to the other embodiment.

As shown in FIG. 21, the multiple first light-emitting elements 121 that are included in the multiple light-emitting devices 100A are electrically connected in series via a wiring part 262*b*; and the multiple second light-emitting elements 122 that are included in the multiple light-emitting devices 100A are electrically connected in series via a wiring part 262*g*.

The light source 200 includes one drive circuit that can supply a drive current $I_B$ to the first light-emitting elements 121 and can supply a drive current $I_G$ to the second light-emitting elements 122. The light source 200 includes a switch that switches between the first state in which the output from the drive circuit (the thick arrow in FIG. 21) and a terminal Tb connected to an electrode (e.g., the anode) of the first light-emitting element 121 are connected and the second state in which the output from the drive circuit and a terminal Tg connected to an electrode (e.g., the anode) of the second light-emitting element 122 are connected. Similarly to the driving method of the light source 10 described above, due to the switching of the switch, the drive current $I_B$ is supplied to only the first light-emitting elements 121 in the first state; and the drive current $I_G$ is supplied to only the second light-emitting elements 122 in the second state.

The light source 200 also includes a timing controller controlling the operation timing of the switch switching between the first state and the second state. Similarly to the driving method of the light source 10 described above, the timing controller can cause the length of the first period $t_B$ of the first state in which the output of the drive circuit is connected to the terminal Tb and the length of the second period $t_G$ of the second state in which the output of the drive circuit is connected to the terminal Tg to be different. Alternatively, the timing controller can cause the first current value $I_B$ output by the drive circuit in the first period $t_B$ of the first state and the second current value $I_G$ output by the drive circuit in the second period $t_G$ of the second state to be different. The length of the first period $t_B$ and the length of the second period $t_G$ can be caused to be different while causing the first current value $I_B$ and the second current value $I_G$ to be different.

Examples of linear light sources driven by a driving method such as that described above are shown in FIGS. 22 and 23. In a light source 200A included in a backlight 300A shown in FIG. 22, similarly to the light source 200 described with reference to FIGS. 18 to 20, the light-emitting device 100A and the light-emitting device 100B are alternately arranged in the second direction (the X-direction). In a linear light source 200B included in a backlight device 300B shown in FIG. 23, the light-emitting devices 100A (or the light-emitting devices 100B) are located in one column in the second direction (the X-direction).

The light sources 200A and 200B each include the multiple light-emitting devices 100A and/or 100B electrically connected in series, the drive circuit 210 supplying a current driving the light-emitting devices 100A and/or 100B, the switch 240, and the timing controller 220 controlling the operation timing of the drive circuit 210 and the switch 240.

An electrode (e.g., an anode) B1*a* of the first light-emitting element 121 is electrically connected with the switch 240 via the wiring part 262*b*. A current is supplied from the drive circuit 210 to only the first light-emitting element 121 in the first state in which the electrode B1*a* of the first light-emitting element 121 and the switch 240 are electrically connected.

An electrode (e.g., an anode) G1*a* of the second light-emitting element 122 is electrically connected with the switch 240 via the wiring part 262*g*. A current is supplied from the drive circuit 210 to only the second light-emitting element 122 in the second state in which the electrode G1*a* of the second light-emitting element 122 and the switch 240 are electrically connected. The switch 240 is switched between the first state and the second state by the control of the timing controller 220. Power is supplied from a power supply 400 to the drive circuit 210 and the timing controller 220.

The electrodes (the anodes B1*a*, B2*a*, B3*a*, and B4*a* and cathodes B1*c*, B2*c*, B3*c*, and B4*c*) of four first light-emitting elements 121 are electrically connected in series via the wiring part 262*b*. The electrodes (the anodes Gla, G2*a*, G3*a*, and G4*a* and cathodes G1*c*, G2*c*, G3*c*, and G4*c*) of four second light-emitting elements 122 are electrically connected in series via the wiring part 262*g*.

According to the light source 200A or the light source 200B of the configuration described above, the first light-emitting element 121 and the second light-emitting element 122 that have mutually-different light emission colors both can be driven by one drive circuit 210. As a result, the linear light source can be smaller and less expensive. There are cases where the chromaticity of the light source 10 changes due to a change of the ambient temperature and/or changes of the luminances of the first and second light-emitting elements 121 and 122. The light source 10 can easily obtain white light of the desired chromaticity by easily modifying the driving parameters according to the luminance and/or ambient temperature change.

The forward voltage $Vf_G$ of the second light-emitting element 122, which is a green LED element, is less than the forward voltage $Vf_B$ of the first light-emitting element 121, which is a blue LED element. Therefore, a general driver IC mass-produced for blue LED elements can be shared as the drive circuit 210 driving the first light-emitting element 121 and the second light-emitting element 122, making possible an inexpensive light source in which the desired chromaticity is obtained.

A light-emitting device that combines one of a KSF-based phosphor (e.g., $K_2SiF_6$:Mn) or a KSAF-based phosphor (e.g., $K_2Si_{0.99}Al_{0.01}F_{5.99}$:Mn) in the phosphor in the wavelength conversion layer can be used as the light-emitting device of a backlight unit including a light source using the driving method described above. Compared to other phosphors, these phosphors have persistence characteristics such that a light-emitting element, once lit, emits light for a certain period even after being switched off. That is, in such a light-emitting device, when the first light-emitting element 121 is lit, and then the first light-emitting element 121 is switched off and the second light-emitting element 122 is switched on, red light is emitted for a certain period; therefore, mixed light of green light and red light is emitted during this period; and white light with good color mixing can be obtained.

Modification of Light-Emitting Device

Figure 26A:
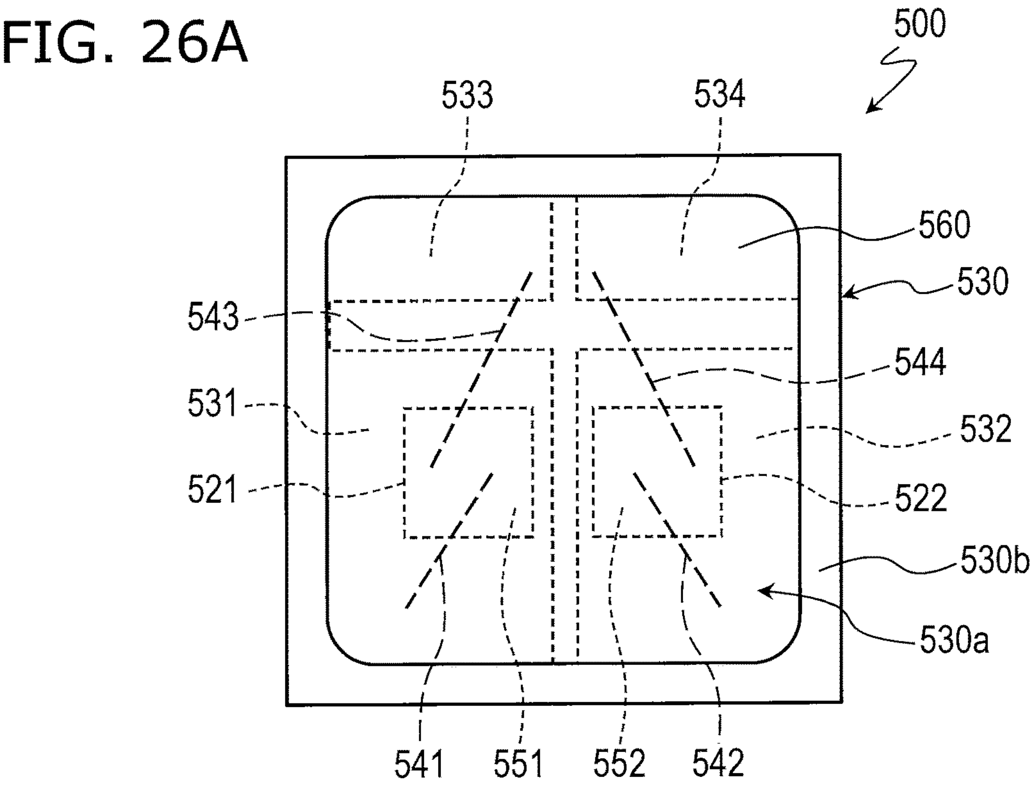
FIG. 26A is a schematic top view showing another example of the light-emitting device according to the embodiment.
Figure 26B:
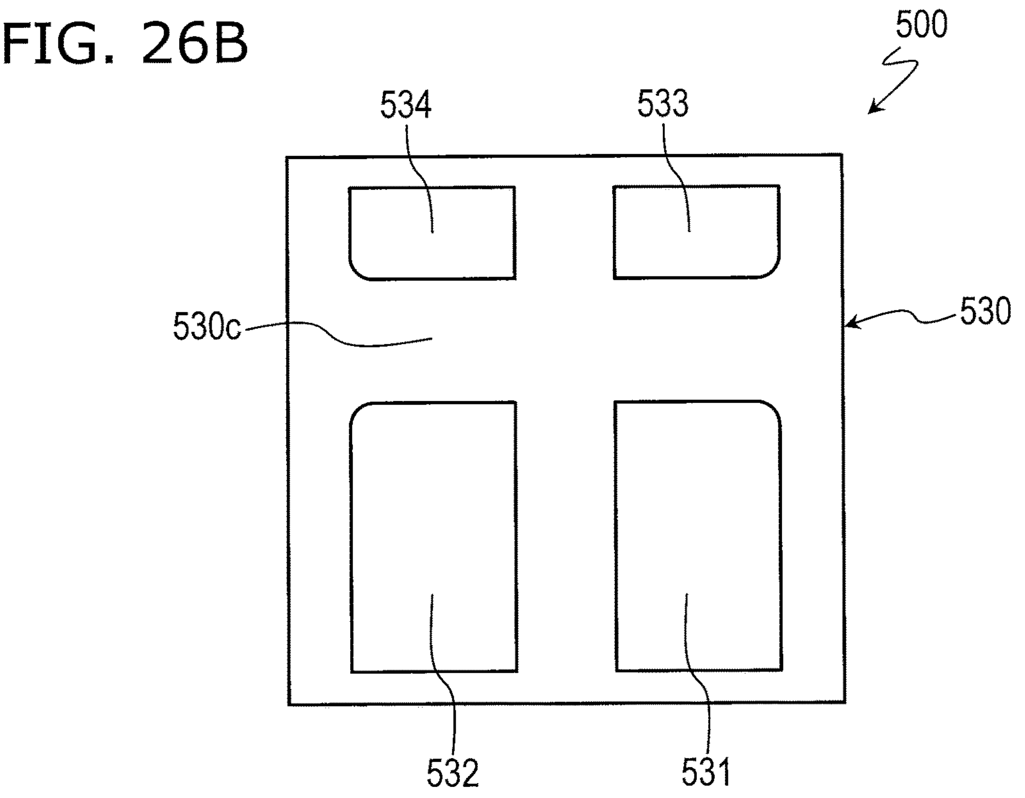
FIG. 26B is a schematic bottom view showing the other example of the light-emitting device according to the embodiment.

FIG. 26A is a schematic top view showing another example of the light-emitting device according to the embodiment; and FIG. 26B is a schematic bottom view showing the other example of the light-emitting device according to the embodiment.

The light-emitting device 500 shown in FIGS. 26A and 26B can be used instead of the light-emitting device of the light source described above. The light-emitting device 500 can be used as a light source for a direct-type backlight in which light enters a light guide plate through the lower surface of the light guide plate. The light-emitting device 500 includes a first light-emitting element 521 and a second light-emitting element 522. The first light-emitting element 521 can include a semiconductor structure body similar to the semiconductor structure body of the first light-emitting element 121 described above, and is a blue LED element emitting mainly blue light. The second light-emitting element 522 can include a semiconductor structure body similar to the semiconductor structure body of the second light-emitting element 122 described above, and is a green LED element emitting mainly green light. The forward voltage of the second light-emitting element 522 is less than the forward voltage of the first light-emitting element 521.

The light-emitting device 500 further includes a resin member 530 supporting the first light-emitting element 521 and the second light-emitting element 522. The resin member 530 includes a wall part 530*b* defining a recess 530*a* open at the upper surface side of the light-emitting device 500.

The light-emitting device 500 further includes a first conductive member 531, a second conductive member 532, a third conductive member 533, and a fourth conductive member 534 electrically connected with the first and second light-emitting elements 521 and 522. The upper surfaces of the first conductive member 531, the second conductive member 532, the third conductive member 533, and the fourth conductive member 534 are positioned at the bottom portion of the recess 530*a*. The first light-emitting element 521 is located at the upper surface of the first conductive member 531; and the second light-emitting element 522 is located at the upper surface of the second conductive member 532. As shown in FIG. 26B, the lower surface of the first conductive member 531, the lower surface of the second conductive member 532, the lower surface of the third conductive member 533, and the lower surface of the fourth conductive member 534 are not covered with the resin member 530 at a lower surface 530*c* of the resin member 530. The lower surface 530*c* of the resin member 530 is the mounting surface for mounting to the wiring substrate.

The first light-emitting element 521 and the second light-emitting element 522 each include an anode electrode and a cathode electrode located at the upper surface. As shown in FIG. 26A, one of the anode electrode or the cathode electrode of the first light-emitting element 521 is electrically connected with the first conductive member 531 via a conductive wire 541; and the other of the anode electrode or the cathode electrode is electrically connected with the third conductive member 533 via a conductive wire 543. One of the anode electrode or the cathode electrode of the second light-emitting element 522 is electrically connected with the second conductive member 532 via a conductive wire 542;

and the other of the anode electrode or the cathode electrode is electrically connected with the fourth conductive member 534 via a conductive wire 544.

The light-emitting device 500 can include a first light-transmitting member 551 located on the upper surface of the first light-emitting element 521, and a second light-transmitting member 552 located on the upper surface of the second light-emitting element 522. The first light-transmitting member 551 and the second light-emitting element 522 can include wavelength conversion members similar to the wavelength conversion members described above.

The light-emitting device 500 can include a third light-transmitting member 560 located in the recess 530*a*. The third light-transmitting member 560 covers the first light-emitting element 521, the second light-emitting element 522, the first conductive member 531, the second conductive member 532, the third conductive member 533, the fourth conductive member 534, the conductive wires 541 to 544, the first light-transmitting member 551, and the second light-emitting element 522.

Certain embodiments of the disclosure are useful in various illumination light sources, automotive light sources, display light sources, etc. It is especially advantageous to apply embodiments of the disclosure to a backlight unit facing a liquid crystal display device.

What is claimed is:

1. A light source, comprising:

a light-emitting device including
  a substrate, and
  a first light-emitting element and a second light-emitting element that are located on the substrate;

a support substrate supporting the light-emitting device;

a drive circuit configured to supply a current to drive the light-emitting device;

a switch configured to switch between a first state of supplying a current to only the first light-emitting element, and a second state of supplying a current to only the second light-emitting element; and a timing controller configured to control a timing of an operation of the switch, wherein a light emission peak wavelength of the first light-emitting element is 430 nm or greater and less than 490 nm, a light emission peak wavelength of the second light-emitting element is 490 nm or greater and less than 570 nm, a forward voltage of the second light-emitting element is less than a forward voltage of the first light-emitting element, the substrate includes an upper surface, the upper surface has a rectangular shape defined by a short side and a long side, the short side extends in a first direction, the long side extends in a second direction orthogonal to the first direction, the first light-emitting element and the second light-emitting element are arranged on the substrate along the first direction, and one light-emitting element of the first light-emitting element and the second light-emitting element being positioned between the support substrate and an other light-emitting element of the first light-emitting element and the second light-emitting element in the first direction.

2. The light source according to claim 1, further comprising:

a light-transmitting member positioned above the first and second light-emitting elements, the light-transmitting member including a wavelength conversion member.

3. The light source according to claim 1, wherein a plurality of the light-emitting devices is arranged on the support substrate along the second direction, a plurality of the first light-emitting elements of the plurality of light-emitting devices is connected in series, and a plurality of the second light-emitting elements of the plurality of light-emitting devices is connected in series.

4. A driving method, comprising:

providing the light source according to claim 1; and utilizing the timing controller to cause a length of a first period of the first state and a length of a second period of the second state to be different from each other.

5. A driving method, comprising:

providing the light source according to claim 1; and utilizing the timing controller to cause a first current value output by the drive circuit in the first state and a second current value output by the drive circuit in the second state to be different from each other.

6. The method according to claim 4, wherein the light source further comprises:

a light-transmitting member positioned above the first and second light-emitting elements, the light-transmitting member including a wavelength conversion member.

7. The method according to claim 6, wherein a plurality of the light-emitting devices is arranged on the support substrate along the second direction, a plurality of the first light-emitting elements of the plurality of light-emitting devices is connected in series, and a plurality of the second light-emitting elements of the plurality of light-emitting devices is connected in series.

8. The method according to claim 5, wherein the light source further comprises:

a light-transmitting member positioned above the first and second light-emitting elements, the light-transmitting member including a wavelength conversion member.

9. The method according to claim 8, wherein a plurality of the light-emitting devices is arranged on the support substrate along the second direction, a plurality of the first light-emitting elements of the plurality of light-emitting devices is connected in series, and a plurality of the second light-emitting elements of the plurality of light-emitting devices is connected in series.

10. The light source according to claim 2, wherein a plurality of the light-emitting devices is arranged on the support substrate along the second direction, a plurality of the first light-emitting elements of the plurality of light-emitting devices is connected in series, and a plurality of the second light-emitting elements of the plurality of light-emitting devices is connected in series.

* * * * *